(12) United States Patent
Ponzio et al.

(10) Patent No.: US 12,113,409 B2
(45) Date of Patent: Oct. 8, 2024

(54) APPARATUS AND METHOD FOR MANUFACTURING A PARTIAL NEST OR A NEST OF CONDUCTORS

(71) Applicant: ATOP S.p.A., Barberino Tavarnelle (IT)

(72) Inventors: Massimo Ponzio, Siena (IT); Rubino Corbinelli, Siena (IT)

(73) Assignee: ATOP S.p.A., Barberino Tavarnelle (IT)

( * ) Notice: Subject to any disclaimer, the term of this patent is extended or adjusted under 35 U.S.C. 154(b) by 218 days.

(21) Appl. No.: 17/790,834

(22) PCT Filed: Jan. 26, 2021

(86) PCT No.: PCT/EP2021/051746
§ 371 (c)(1),
(2) Date: Jul. 5, 2022

(87) PCT Pub. No.: WO2021/156106
PCT Pub. Date: Aug. 12, 2021

(65) Prior Publication Data
US 2023/0029116 A1    Jan. 26, 2023

(30) Foreign Application Priority Data

Feb. 4, 2020 (EP) ..................................... 20155271
Oct. 8, 2020 (EP) ..................................... 20200855

(51) Int. Cl.
*H02K 15/08* (2006.01)
*H02K 15/02* (2006.01)
(Continued)

(52) U.S. Cl.
CPC ......... *H02K 15/085* (2013.01); *H02K 15/024* (2013.01); *H02K 15/0428* (2013.01)

(58) Field of Classification Search
CPC . H02K 15/024; H02K 15/0428; H02K 15/085
(Continued)

(56) References Cited

U.S. PATENT DOCUMENTS

| 1,661,344 A | * | 3/1928 | Poole | H02K 15/064 29/735 |
| 2003/0005579 A1 | * | 1/2003 | Takahashi | H02K 15/064 29/596 |

(Continued)

FOREIGN PATENT DOCUMENTS

| EP | 3641111 | 4/2020 |
| IT | 102010901861777 | 1/2012 |
| WO | WO 2018/233769 | 12/2018 |

*Primary Examiner* — Rashad H Johnson
(74) *Attorney, Agent, or Firm* — Haley Guiliano LLP; Jeffrey H. Ingerman

(57) ABSTRACT

The invention is directed to an apparatus (100) and a method for manufacturing a partial nest or a nest (5) of pin conductors (1, 1$_i$, 1$_o$) for forming a stator. The apparatus (100) comprises a stator core template (10) with a block body (11) and radially extending ribs (12) forming slots (13) there between for insertion of legs (2, 2$_i$, 2$_o$) of the pin conductors (1, 1$_i$, 1$_o$). The apparatus (100) comprises at least one ring element (25, 33, 42) being arranged to provide an outer radial abutment face for inserted pin conductors (1, 1$_i$, 1$_o$).

29 Claims, 19 Drawing Sheets

Figure 1:
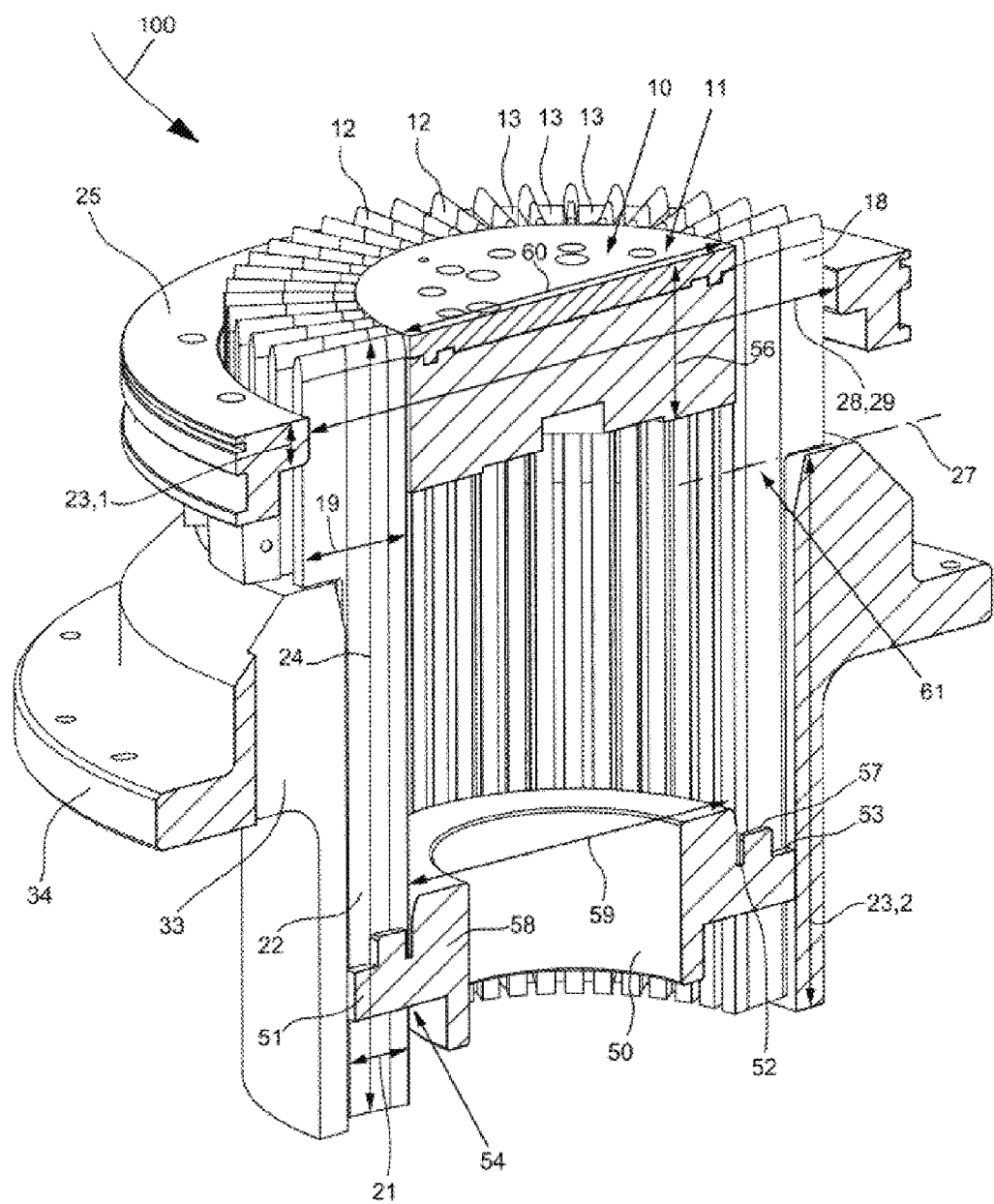

(51) Int. Cl.
*H02K 15/04* (2006.01)
*H02K 15/085* (2006.01)

(58) Field of Classification Search
USPC .................................................... 310/254.1
See application file for complete search history.

(56) References Cited

U.S. PATENT DOCUMENTS

| | | | |
|---|---|---|---|
| 2013/0276295 A1* | 10/2013 | Guercioni | H02K 15/0421 |
| | | | 29/596 |
| 2017/0302143 A1* | 10/2017 | Niccolini | H02K 15/10 |
| 2018/0091029 A1* | 3/2018 | Hashimoto | H02K 15/0428 |
| 2019/0006922 A1* | 1/2019 | Walter | H02K 15/0428 |
| 2019/0296620 A1* | 9/2019 | Miyashita | H02K 3/12 |
| 2020/0227985 A1* | 7/2020 | Dotzel | H02K 15/085 |
| 2020/0343797 A1* | 10/2020 | Takeda | H02K 15/064 |
| 2021/0075288 A1* | 3/2021 | Weber | H02K 15/12 |
| 2021/0111612 A1* | 4/2021 | Beyer | H02K 15/0087 |
| 2021/0234443 A1* | 7/2021 | Stock | H02K 15/0414 |
| 2023/0029116 A1* | 1/2023 | Ponzio | H02K 15/0428 |

* cited by examiner

APPARATUS AND METHOD FOR MANUFACTURING A PARTIAL NEST OR A NEST OF CONDUCTORS

The invention is directed to an apparatus and a method for manufacturing a partial nest or a nest of pin conductors for forming a stator.

It is known to provide stators for electrical motors with a plurality of hairpin conductors which are arranged in slots of a stator core.

The hairpin conductors are typically provided with two legs and a bridge portion joining the two legs. Each leg is inserted into a respective slot. The bridge portion extends axially outwardly of the stator on one axial side of the stator core whereas the legs extend out of the slots on the opposite axial side of the stator core. By mutually connecting two of the extending legs, a continuous conductor similar to a winding can be created.

Hairpin conductors may be inserted into the slots in a raw, non-final shape and, once inserted into the slots, be subsequently deformed into the final shape, e.g. by twisting operations. Such an arrangement is e.g. known from EP 945 952 A1. This method requires additional twisting steps and hence is complicated.

Alternatively, it is known to provide completely preshaped hairpin conductors which are provided in a shape which corresponds to the final shape in the stator core. Such conductors are pre-assembled into a partial or a full nest outside the stator core and are inserted into the slots of the stator as a preformed nest. No subsequent deformation such as twisting of the conductors within the stator is required in this case.

Co-pending unpublished application EP 18201561.0, which is incorporated herein by reference, discloses a method and an apparatus, wherein a stator core template is provided. The stator core template is designed similar to the stator core and in particular comprises a number of radially and axially extending slots corresponding to the number of slots of the stator core. The slots of the stator core template have a circumferential width which is larger than the circumferential width of the slots of the stator core and/or they have a radial length which is larger than the radial length of the slots of the stator core. This larger size of the slots of the stator core template allows a movement of inserted hairpin conductors between different positions within the slots of the stator core template.

Hairpin conductors, which have been inserted into slots of the stator core template are moved within the slot(s) of the stator core template from a first position to a second position. The direction of movement is at an angle with respect to the insertion direction and typically perpendicular to the insertion direction. By such a subsequent movement the problem of collision between subsequently inserted conductors due to overlapping bridge portions can be avoided.

WO2018/233769 relates to a pre-pinning nest and a method for forming a ring from a plurality of U-shaped, electrically conductive hairpins in order to be able to subsequently install the ring in a machine element of an electrical machine, for example a stator. A receiving element has a plurality of slots in which the limbs of the hairpins are received. The size and geometry of the slots are designed such that in each case a first limb of a hairpin can rotate inside the slot in order to enable the second limb of the hairpin to be positioned in another slot in an unconstrained manner. The receiving element may have an inner ring on the outside of which the side walls of the slots are formed or the receiving element may have an outer ring on the inside of which the side walls of the slots are formed.

However, a partial nest or a nest of conductors may not only comprise hairpin conductors, but may also comprise conductors of a different type, for example i-pin conductors or jumper conductors. I-pin conductors are conductors which have only one leg and are e.g. used for electric connection to external conductors. They usually have a greater axial extension than hairpin conductors used for the same nest. Jumper conductors are used to make a connection between two different layers of hairpin conductors, and may comprise two or more legs.

Since i-pin conductors only comprise one leg, they are not capable of stabilising their orientation by a second leg in a second slot. Hence, there is a risk that i-pin conductors tilt after inserting into a slot of a stator core template. Subsequent inserting of further conductors and/or correctly connecting of the extending legs may be difficult or impossible.

It is therefore an object of the present invention, to overcome the disadvantages of the prior art and in particular to provide an apparatus and a method for manufacturing a partial nest or a nest of conductors for forming a stator with a plurality of pin conductors, which provides a sufficient stabilisation of the inserted conductors, especially when i-pin conductors are used.

According to the present invention, these and other objects are solved with an apparatus and a method according to the independent patent claims.

The apparatus for manufacturing a partial nest or a nest of pin conductors for forming a stator according to the present invention comprises a stator core template. Said stator core template comprises a block body provided with radially extending ribs.

The block body may essentially have the form of a circular cylinder.

Said ribs form slots therebetween for insertion of legs of the pin conductors.

The ribs preferably are compact and solid elements which provide a stable distance between the slots. They preferably do not comprise and are not made of a bent sheet metal.

The ribs may be machined parts, which are processed to have a different thickness along the radial direction. They may be made of Steel.

Typically the apparatus may comprise 48-72 ribs to form a corresponding number of slots. The ribs may have a maximal thickness of 2 mm-6 mm, a radial length of 40-45 mm, in particular 43 mm, and an axial length of 260-270 mm, in particular 267 mm. The slots have an opening angle of 7.5°-5°.

The apparatus further comprises at least one ring element arranged to provide an outer radial abutment face for inserted pin conductors.

The abutment face defines a radial limitation, beyond which the pin conductor may not move radially outwards.

Each slot has two circumferential boundaries given by the ribs, and at least one radially inner boundary, provided by the block body. Furthermore, a radially outer boundary may be provided by the at least one ring element. Hence, once a pin conductor leg is inserted into a respective slot, it remains within the slot and cannot tilt radially outwardly.

The ribs, the ring element and the block body may have the same axial length. However, in a preferred embodiment, the ribs, the ring element and the block body have different axial lengths.

In a preferred embodiment the at least one ring element has an axial extension which is smaller than the axial extension of the ribs.

Hence, for example more than one ring element maybe provided, which ring elements are arranged one above the other.

The block body fills the radial inner space between the ribs, at least over a part of the axial length of the ribs. Thus, the block body stabilizes the arrangement of the ribs.

A pin conductor approaching the stator core template may enter only a slot between two radially adjacent ribs, as there is no other free space.

The block body may be machined as a single piece, but may also comprise more than one piece. The block body may for example comprise several parts which are axially aligned with respect to each other.

The block body may be connected to or connectable to an actuator via a coupling for inducing a rotational movement. Preferably there is provided a coupling which is centrally or concentrically arranged, such that an evenly running rotational motion of the stator core template can be achieved.

In an advantageous embodiment of the apparatus an upper level of the block body and an upper level of the ribs are essentially on same axial level. The "upper" side means the side from which the conductors are inserted into the stator core template. During use the stator core template typically has an upright position, such that insertion of conductors is facilitated by gravitation.

The upper edge of the ribs may have a slight inclination between the radially inner and the radially outer ends, such that pin conductors tent to slide towards the radially inner end. Preferably the upper level of the radially inner edge of the ribs merges into the upper level of the block body.

At least a part of block body and the ribs may be machined as a single piece, in particular from a steel cylinder. Alternatively, the ribs may be fixed to at least a part of the block body, for example to at least one of axially aligned pieces of the block body.

The ribs may for example fixed by respective form fit connections. The ribs may have a male projection which is inserted in a respective female recess arranged within the block body. The plug connections may be secured by one of the pieces of the bock body, which prevents the male projections from leaving the female recesses.

In a preferred embodiment of the invention at least an upper part of the ribs has a radial length which is larger than the radial length of a lower part of the ribs.

The axial length of the upper part may be smaller than the axial length of the lower part.

The larger radial length of the upper part in particular facilitates the insertion of the pin conductor legs into the slot.

Preferably the radial length of the upper part and more preferably also the radial lengths of the lower part are larger than the radial length of the slots of the stator core to facilitate insertion and subsequent movement of the pin conductors.

The ribs may comprise a continuous transition between the upper part and the lower part. The continuous transition may for example be formed as a step.

Advantageously, the outer radius in the region of the lower part corresponds to the outer radius of the stator to be manufactured.

The at least one ring element may be formed by a separate ring being connected to the ribs.

In particular the separate ring may be non-rotatably connected to the ribs. When for example the block body and the ribs are rotated, the separate ring rotates together with the block body and the ribs.

In particular the separate ring may be attached to shelf elements, which are connected to the ribs.

As the separate ring has a fixed circumferential and axial position with respect to the ribs and the block body, the separate ring may be considered to form a part of the stator core template.

Advantageously, an upper level of the separate ring is arranged axially below the upper level of the block body and/or axially below the upper level of the ribs.

In particular, the ribs may comprise an upper part and a lower part as described above and the separate ring is arranged above the continuous transition.

More particularly, the inner radius of the separate ring may correspond to the outer radius of the upper part of the ribs.

Thus, the separate ring provides a radially outer boundary of the slots in the regions of the upper part of the ribs and prevents upper parts of inserted pin conductors from tilting radially outwardly out of the slots.

The radially outward facing side of the separate ring may comprise a contact surface for a bearing or for a drive element to generate a rotary motion.

In an alternative embodiment of the apparatus the at least one ring element is formed by a support ring rotatably arranged with respect to the ribs.

The apparatus may comprise a separate ring as described above and a support ring.

In particular, the support ring comprises a, in particular annular, fixing flange for fastening the separate ring to a mounting frame.

The mounting frame provides a structure fixed in the space. The support rings remains in a fixed position with respect to the mounting frame and the space when the stator core template is rotated. However, the support ring prevents the pin conductor legs from radially moving or tilting to the outside of least along a part of the axial length of the ribs.

Preferably, the inner radius of the support ring corresponds to an outer radius of a lower part of the ribs, such that the support ring forms a radial outer boundary of the lower part of the slots.

In particular, the apparatus is an apparatus with ribs having an upper and a lower part as described above, and the support ring is arranged below the continuous transition. Thus the support ring provides for positioning in particular the legs of the pin conductors when they reach their intended position in the stator core template.

Advantageously, the support ring may provide a guiding face at the upper part of its abutment face for guiding pin conductors to the lower part of the slots. The guiding face may have a downwardly decreasing inner diameter.

Additionally or alternatively, a separate ring may be arranged axially above the support ring and axially above the continuous transition.

In a preferred embodiment of the apparatus the support ring comprises an opening for inserting a pusher element into at least one slot from the radially outer side.

The opening may have a circumferential width of at least the maximal circumferential width of a slot formed by adjacent ribs.

The opening may extend axially more than circumferentially. The opening may axially extend down to the lower end of the support ring.

Preferably, the apparatus comprises a lower pusher element, which is arranged to be radially moveable into the opening of the support ring from the radial outside of the support ring and, more preferably, into the slot.

The lower pusher element may move a pin conductor leg in radial direction to change the distance with respect to the central axis of the stator core, in particular a leg of an i-pin conductor.

In an alternative embodiment of the apparatus the at least one ring element is formed by a hood element. The hood element has a radially inner surface arranged axially above the upper level of the ribs.

The radially inner surface of the hood element has an inner diameter, which is smaller than an outer diameter of the upper level of the stator core template and is adapted to contact an upper part of at least a part of inserted pin conductors.

The inner diameter may correspond to the outer diameter of the part of the nest or the nest to be manufactured.

Especially, the upper parts of inserted i-pin conductors having only one leg and regularly being longer than other pin conductors are prevented from tilting radially outwardly out of the slot.

The hood element may comprise a horizontally arranged top wall comprising the abutment face provided by the radially inner surface. The hood element may also comprise a lateral wall being parallel to the longitudinal axis of the stator core template The abutment face provided by the radially inner surface of the hood element can contact the upper part of the pin conductors, which protrude from the top of the slots after having been inserted and having been positioned in a radially outermost position. Thereby the hood element provides for keeping an upright position of i-pin conductors of the radially outermost layer of a partial nest or a nest of pin conductors.

The hood element preferably is fastenable to a mounting frame and preferably is arranged rotatably with respect to the ribs.

Advantageously the hood element has a shape of a ring segment with an open area which allows access for at least one upper pusher element for pushing inwardly the upper part of at least one inserted pin conductor.

The opening angle of the open area preferably is between 80° and 90°, in particular 85°.

In a beneficial embodiment at least one outer positioning tool may be associated with the hood element. Each of the at least one outer positioning tool has a radially inwardly protruding pocket element providing at least one pocket for stabilizing the radial outside of an i-pin conductor.

The at least one outer positioning tool preferably is radially moveable. The at least one outer positioning tool remains in a radially outer position as long as and until all hairpins have been inserted into the slots. The outer positioning tool does not affect the rotation of the ribs in the outer position.

Each of the i-pin hairpins of the outermost layer may be inserted into a respective pocket of a positioning tool which is aligned with a respective slot between the ribs.

Once all i-pin hairpins have been inserted, the outer positioning tools may be moved inwardly to move the upper portions of the i-pin conductors towards the inner layers of the nest.

The pockets prevent radial outward and inward tilting or movement of the upper portions of the i-pin conductors.

The pockets also prevent rotation around an axis of the i-pin conductors because the shape and size of the pockets may be chosen such as to provide an engagement between the legs of the i-pin conductors and the pockets when the legs are rotated. The legs typically have a rectangular cross section.

The radial width of the pockets may be chosen slightly larger than the radial width of the legs such that the radially inner and outer surfaces of the legs come in contact with the radially inner and radial outer wall of the pocket as soon as the i-pin conductor is only slightly rotated. A rotation of the i-pin conductors is prevented. Hence the outer positioning tool stabilizes the i-pin hairpins of the outermost layer.

Preferably, the apparatus comprises at least one such upper pusher element for pushing inwardly the upper part of at least one inserted pin conductor.

Especially pin conductors of an inner layer regularly have to be pushed into a second position after having been axially inserted into the slots.

According to a further aspect of the invention an apparatus for manufacturing a partial nest or a nest of pin conductors for forming a stator comprising a stator core template has a block body provided with radially extending ribs. Said ribs form slots therebetween for insertion of legs of the pin conductors.

Preferably the apparatus is an apparatus as described above. At least one rim segment is mounted to the upper face of the block body. The rim segment prevents radial inward bending or movement of at least one upper part of a pin conductor.

Favourably, the outer diameter of the rim segment corresponds to the inner diameter of the slots formed by the ribs.

The rim segment may be fixedly mounted to the block body. When the stator core template is rotated, the rim element rotates together with the stator core template and continues to support the pin conductors arranged in the innermost layer.

Preferably i-pin conductors of the innermost layer need a radially inner support. Usually only an angular segment of a partial nest or a nest of pin conductors is equipped with i-pin conductors. The rim segment hence may only extend along a part of the slots and thus only an annular segment of the stator core template. Preferably the rim segment extends over an angle of between 60° and 80°, in particular 70°.

The apparatus may comprise more than one rim segment, for example in case that more than one angular segment is needed for radial inner support of pin conductors.

The rim segment may comprise a radially outwardly protruding pocket-element providing pockets for supporting the radial outside of an i-pin conductor.

The pocket-element may be formed by a railing which is mounted to the outer surface of the rim segment and extends in a circumferential direction along at least a part of the outer surface of the rim segment.

Along the circumferential direction there may further be arranged at least one separating member connecting the outer surface of the rim segment and the railing. Preferably, a number of pockets is formed by a corresponding number of separating members.

The railing, the outer surface of the rim segment, at least one separating member and/or at least one lateral wall (i.e. wall facing a circumferential direction) of the ribs may form a pocket for receiving axial parts of i-pin conductors protruding from the block body.

Preferably the circumferential distance between adjacent separating members corresponds to the radially inner circumferential distance between corresponding lateral walls of adjacent ribs. Each pocket may be assigned to a corresponding slot. The radial width of the separating members preferably may correspond to the radial thickness of a leg of a pin conductor. Each pocket may receive one i-pin conductor.

The pocket-element provides a radial outer support for the i-pin conductors. The pocket-element prevents radial outward tilting or movement of at least an upper part of the i-pin conductor, in particular during removal of the nest from the apparatus.

In a preferred embodiment the apparatus comprises a lifting element. The lifting element comprises coupling for a drive element to generate an axial motion, in particular in order to push upwardly a partial nest or a nest of inserted pin conductors and to expel the partial nest or the nest from the stator core template.

The coupling may be formed by an axial contact face which is directed downwardly, such that the drive element may be moved below the lifting element and below the partial nest or the nest.

The upper face of the lifting element may contact the legs of the pin conductors.

Preferably the lifting element comprises leg supports for receiving legs of the pin conductors. The number of leg supports corresponds to the number of slots and each leg support is arranged in a respective slot.

The leg support may comprise seats for receiving legs of different lengths while each leg contacts a respective seat. Some seats may be lower than other seats to receive a longer leg which extends more in an axially downward direction than other legs.

In particular at least one radially innermost seat and/or at least one radially outermost seat are lower than the other seats for receiving longer legs. Hence, i-pin conductors, typically arranged in the innermost layer and in the outermost layer and axially extending below the other pin conductors may be positioned adequately.

As the lifting element is adapted to move the partial nest or the nest in an upward direction, each leg support should be axially moved within the slot. The legs supports preferably are connected to each other such that the leg supports may be moved collectively.

Preferably, the lifting element comprises an annular element carrying the radially inner sides of the leg supports.

In particular, the annular element comprises the coupling, for example an axial contact face for the drive element.

Preferably, the annular element has an outer diameter which corresponds to the inner diameter of the ribs.

The drive element for the lifting element may be hollow. The rotational drive element extends through the drive element for the lifting element and the annular element of the lifting element and is connected to the block body.

The axial length of the block body may be smaller than the axial length of the ribs. The annular element may hence be axially moveable below the block body.

Preferably, the annular element has an outer diameter which corresponds to the outer diameter of the block body.

The invention further relates to a method for manufacturing a partial nest or a nest of pin conductors for forming a stator comprising the following steps.

An apparatus for manufacturing a partial nest or a nest of pin conductors for forming a stator is provided, preferably an apparatus as described above.

The apparatus comprises a stator core template with a block body provided with radially extending ribs. The ribs form slots therebetween for insertion of legs of the pin conductors. The apparatus comprises at least one ring element arranged to provide an outer radial abutment face for the legs of inserted pin conductors.

At least one pin conductor is inserted into at least one of said slots of the stator core template such that said pin conductor is arranged at a first position within said slot. In said first position the pin conductor is arranged differently than in the intended position in the stator core template.

Said pin conductor is moved within said slot of said stator core template from said first position to a second position.

Preferably at least the step of inserting is repeated for at least one additional pin conductor such as to form a first layer of a partial nest or a nest of pin conductors. More preferably, the stator core template is rotated before a further pin conductor is inserted into the stator core template.

Finally the partial nest or the nest of pin conductors is removed from the stator core template.

Preferably, the partial nest or the nest of pin conductors is removed from the stator core template by axially moving upwards a lifting element comprising leg supports for receiving legs of the pin conductors.

After having been moved upwardly out of the stator core template the partial nest or the nest can be grasped by a gripper system.

In particular at least one i-pin conductor may be inserted into at least one of said slots of the stator core template.

The lower part of the i-pin conductor may be supported and prevented from radially moving or tilting outside of at least a lower part of the ribs by the ring element being formed as a support ring which is rotatably arranged with respect to the ribs.

The leg of the i-pin conductor may be radially moved inward by a pusher element being radially moved into an opening of the support ring. Said opening may have a circumferential width which corresponds to the maximal circumferential width of a slot formed by adjacent ribs.

Preferably, the stator core template is rotated and another pin conductor is inserted into at least another one of the slots. More preferably the steps of inserting an i-pin conductor, of supporting the i-pin conductor and of moving the i-pin conductor are repeated.

During radial movement of the i-pin conductor the leg of the i-pin may be radially moved until it reaches the axial position of a respective seat for receiving legs of pin conductors. Preferably the i-pin conductor then falls down onto the respective seat being arranged on a leg support of the lifting element.

Figure 2:
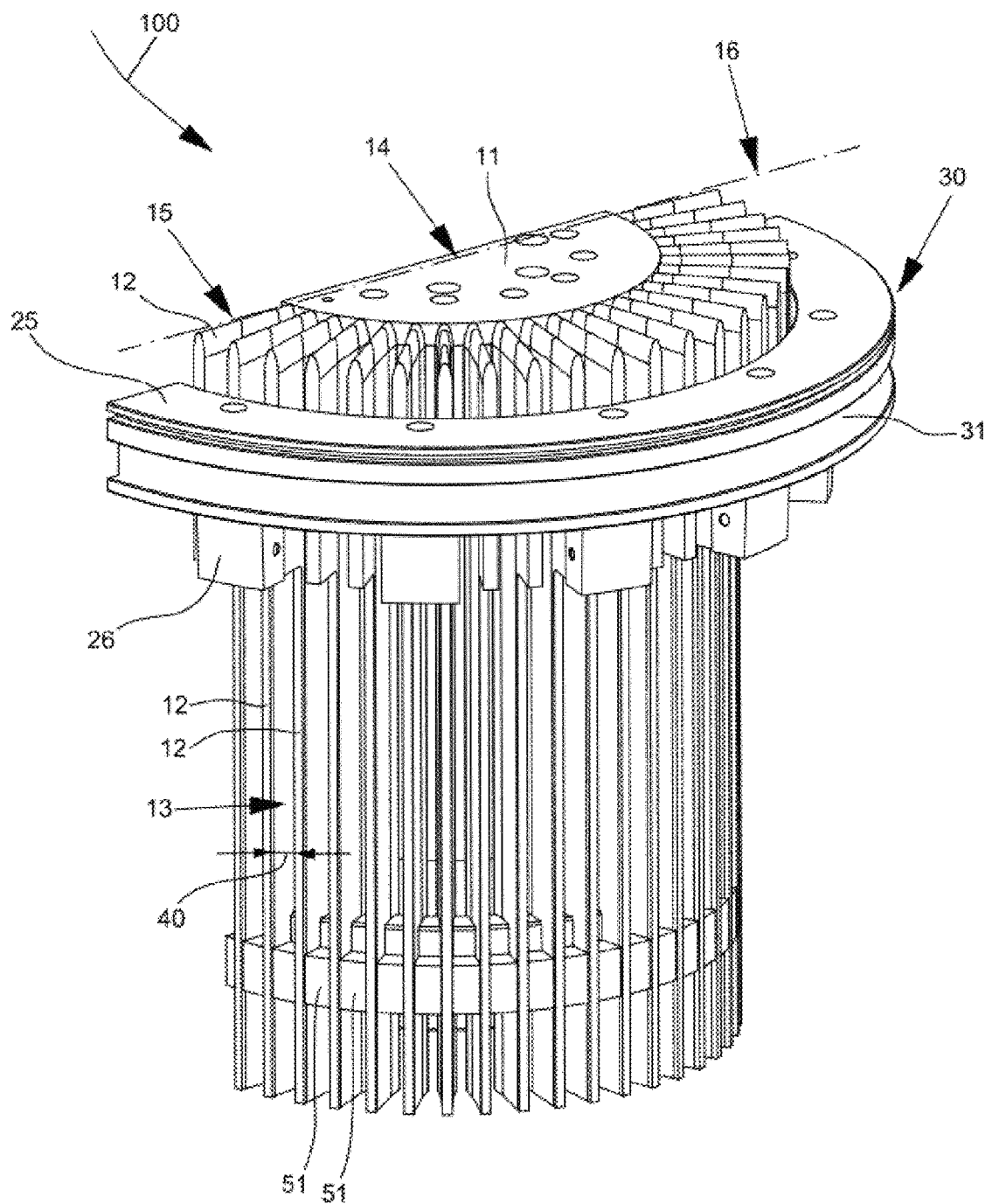
Figure 3:
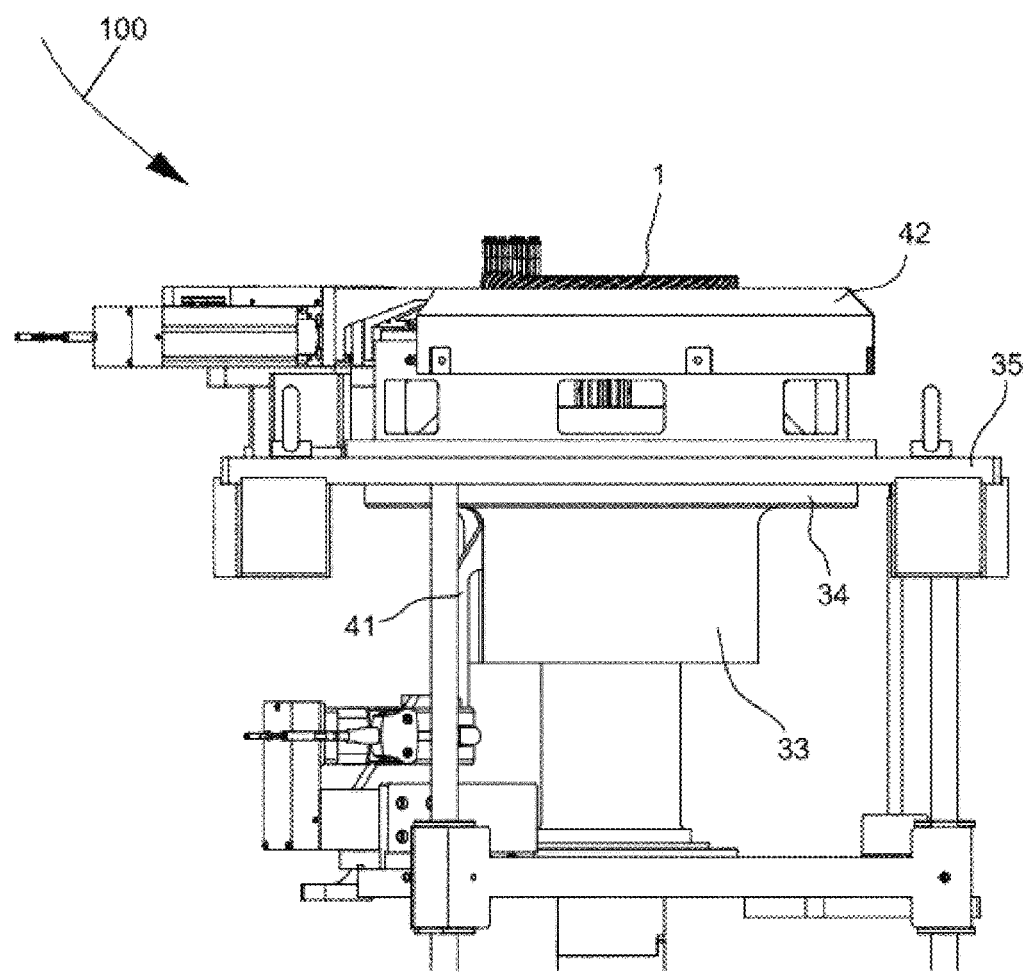
Figure 4:
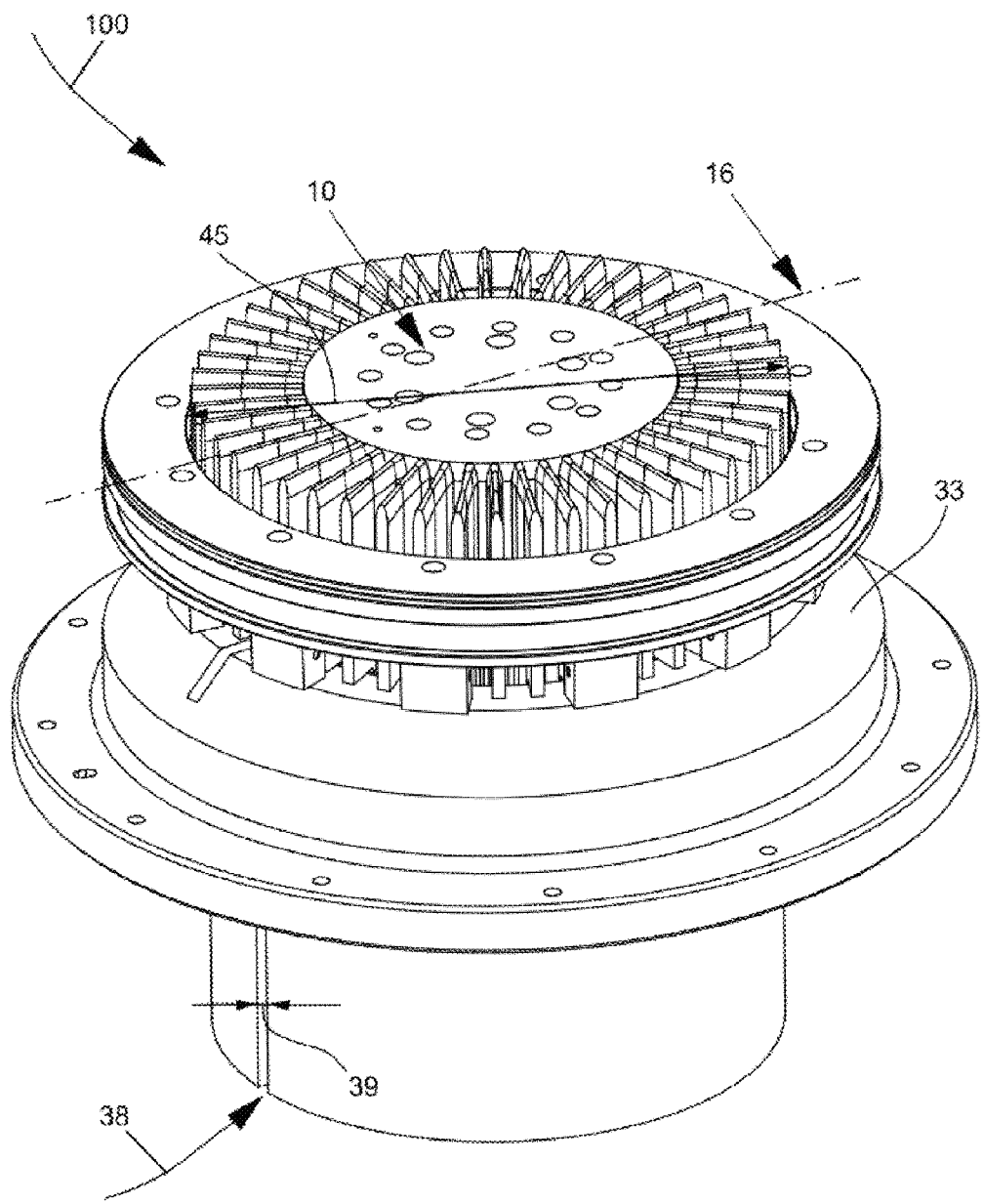
Figure 5:
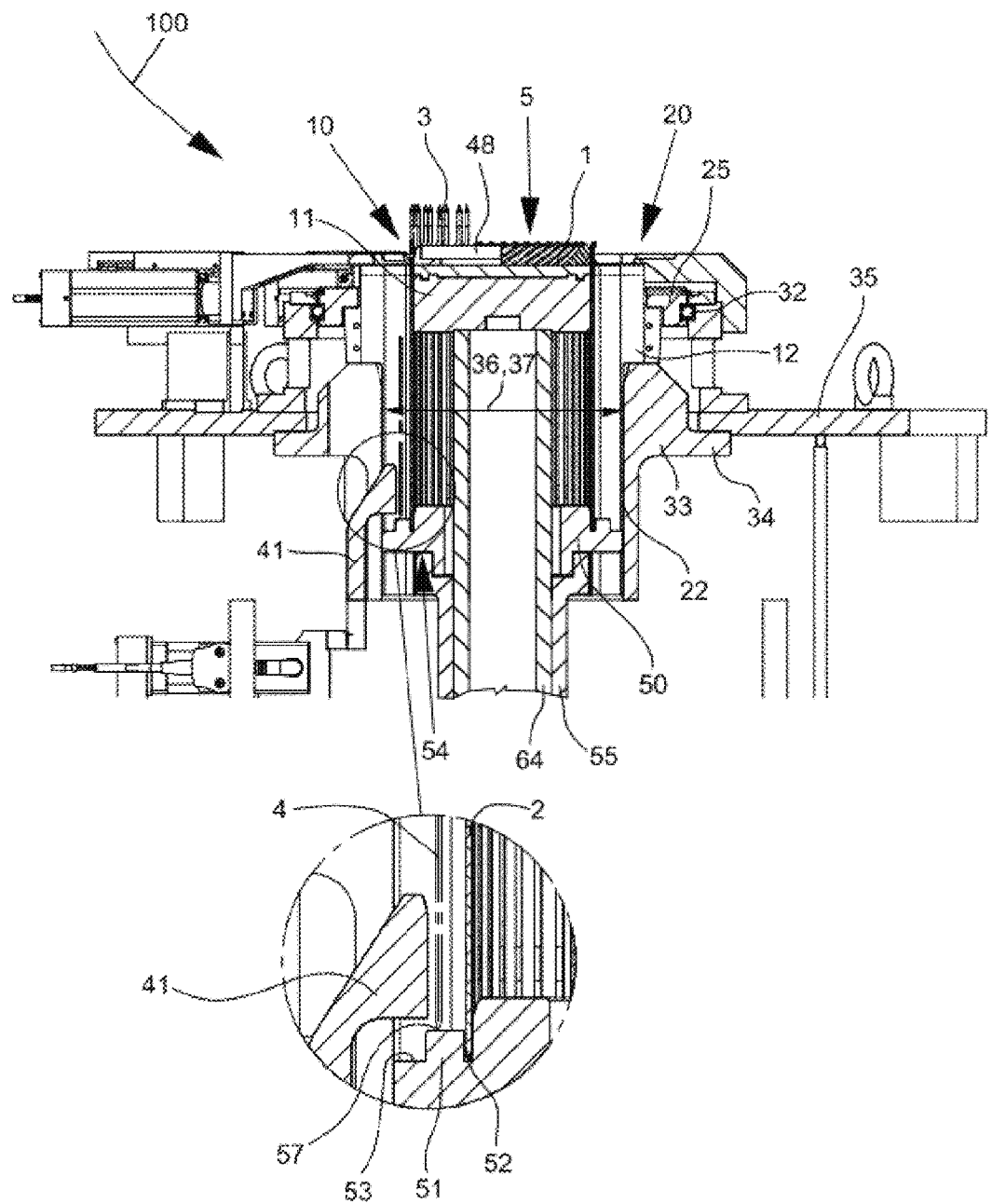
Figure 6:
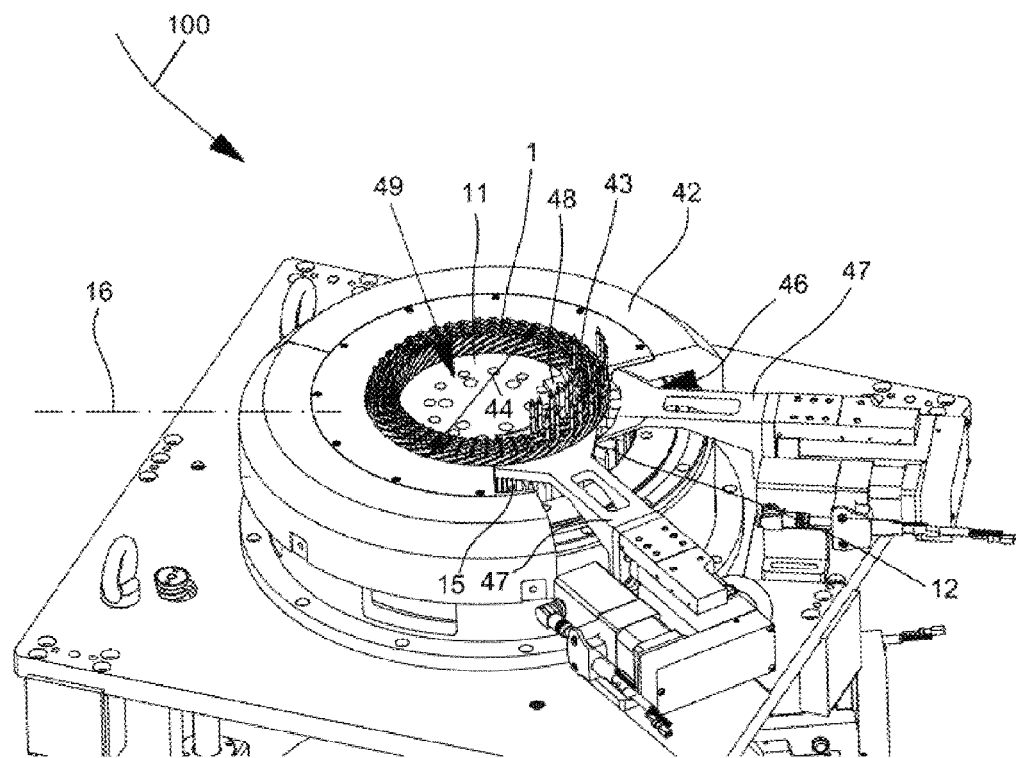
Figure 7:
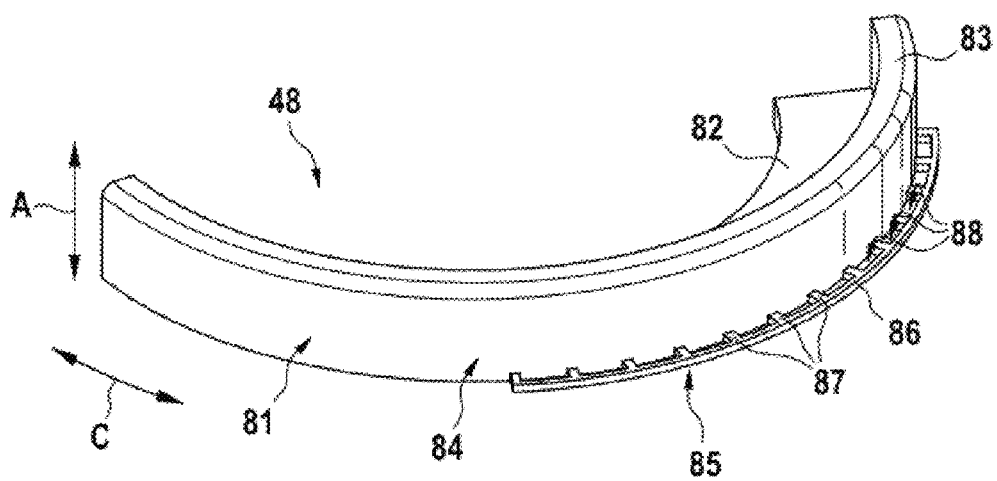
Figure 8:
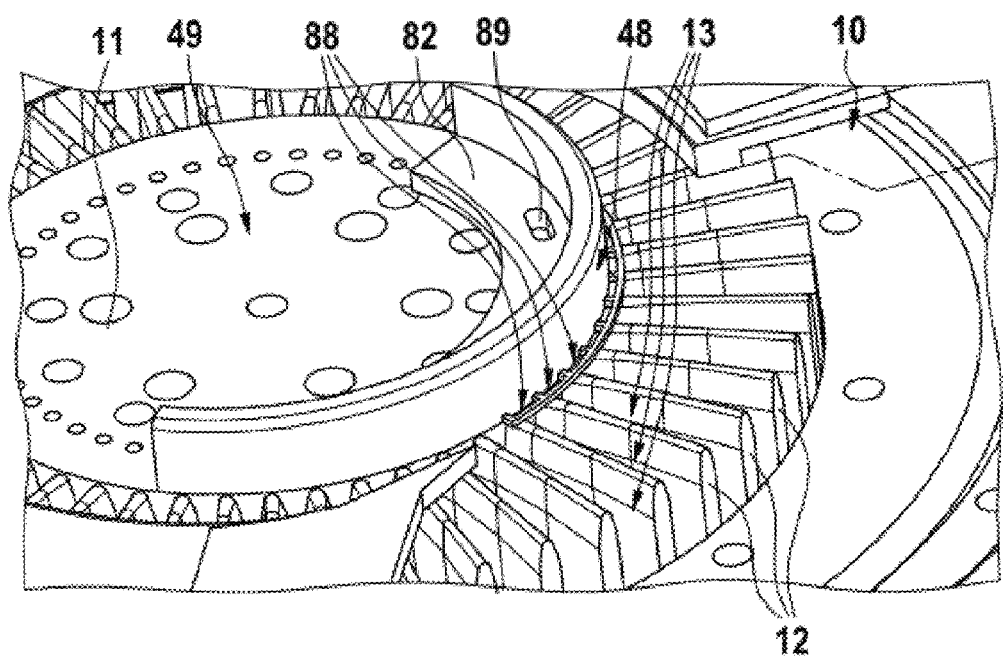
Figure 9:
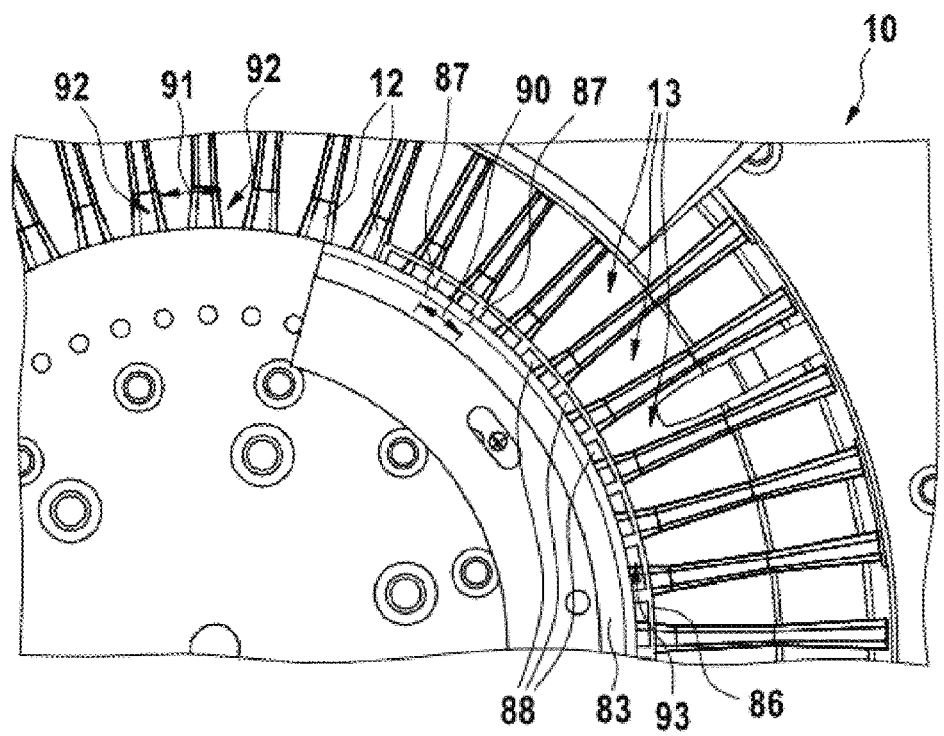
Figure 10:
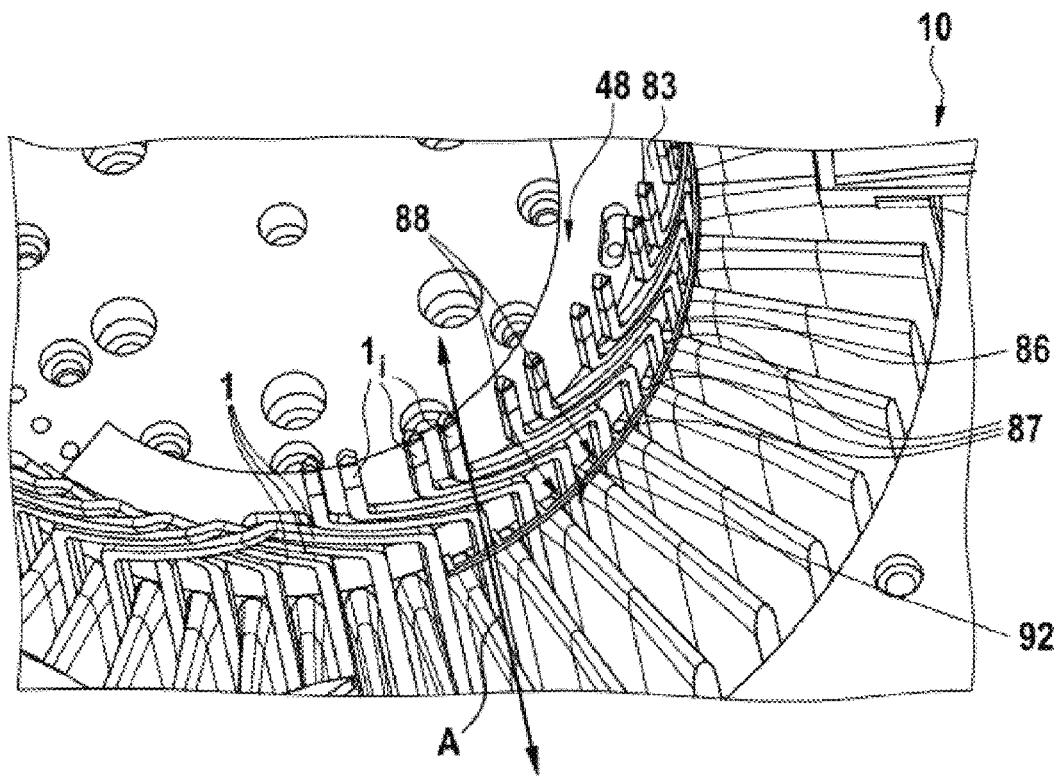
Figure 11A:
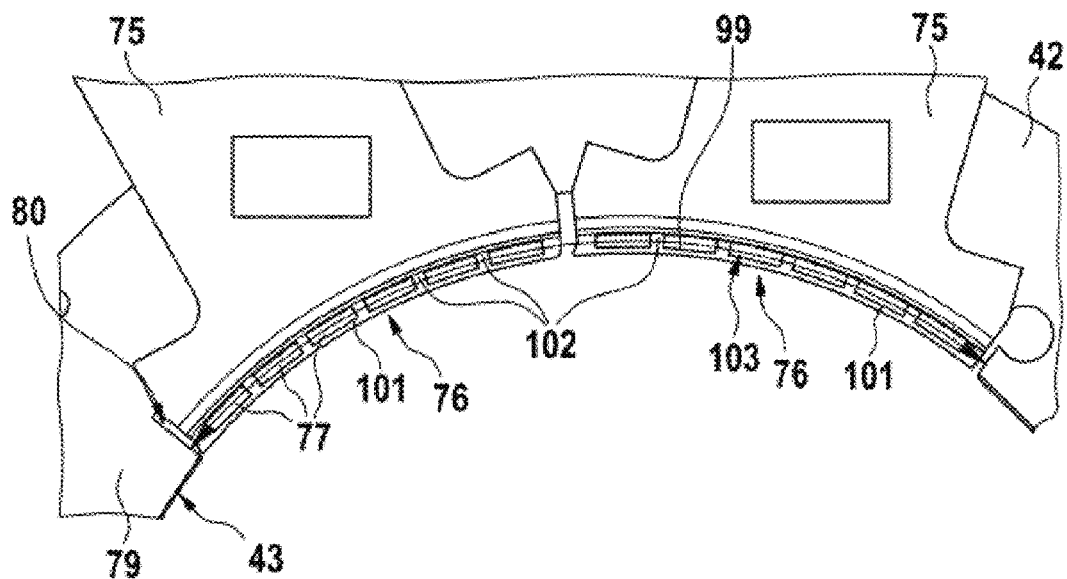
Figure 11B:
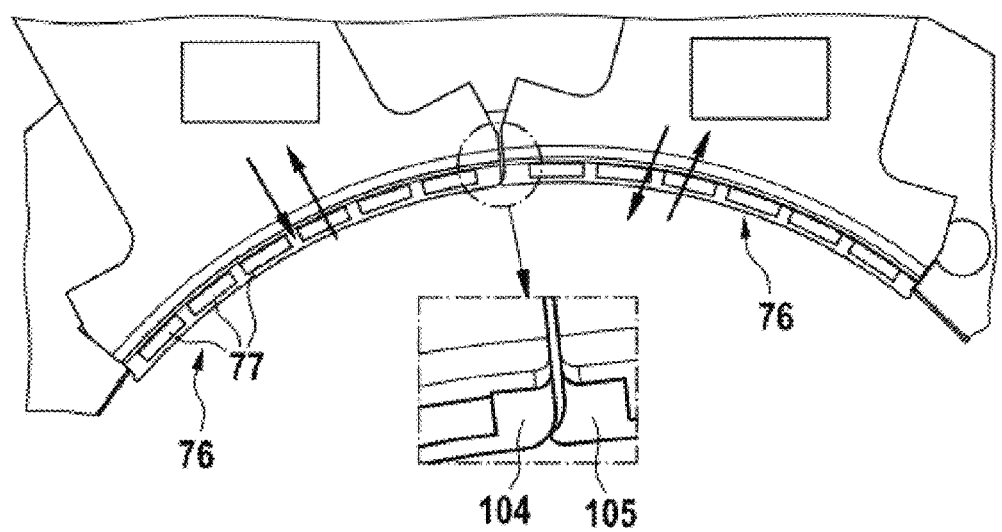
Figure 12:
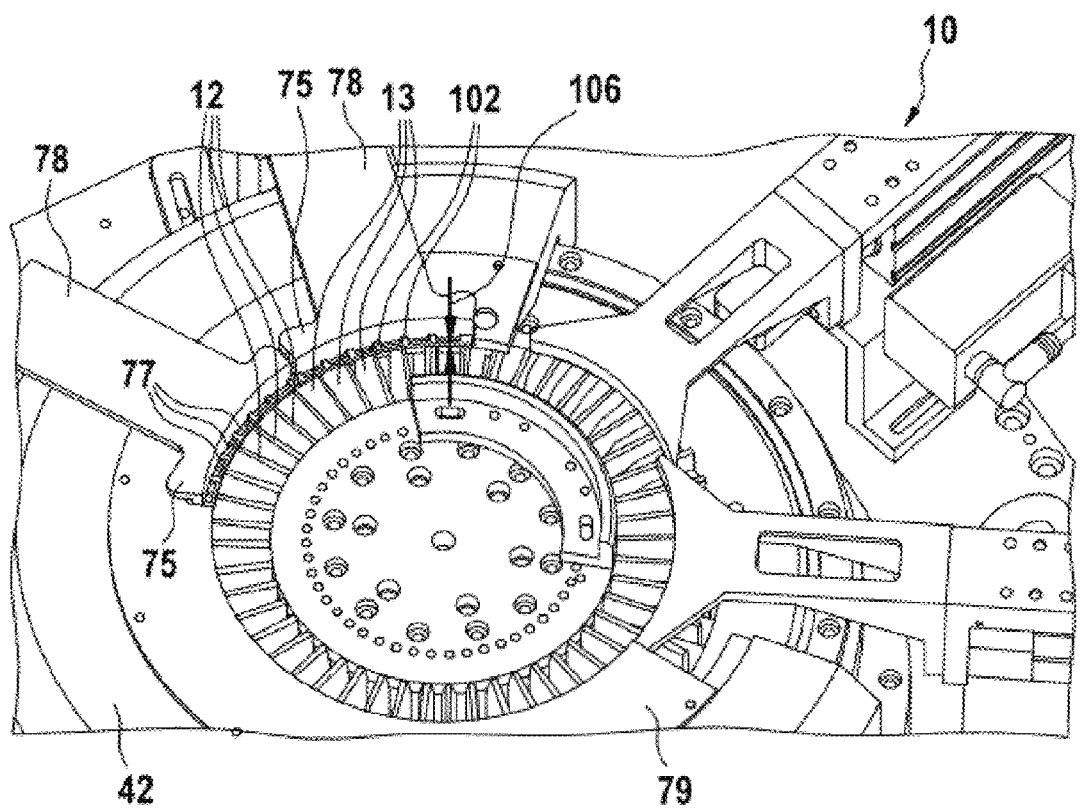
Figure 13:
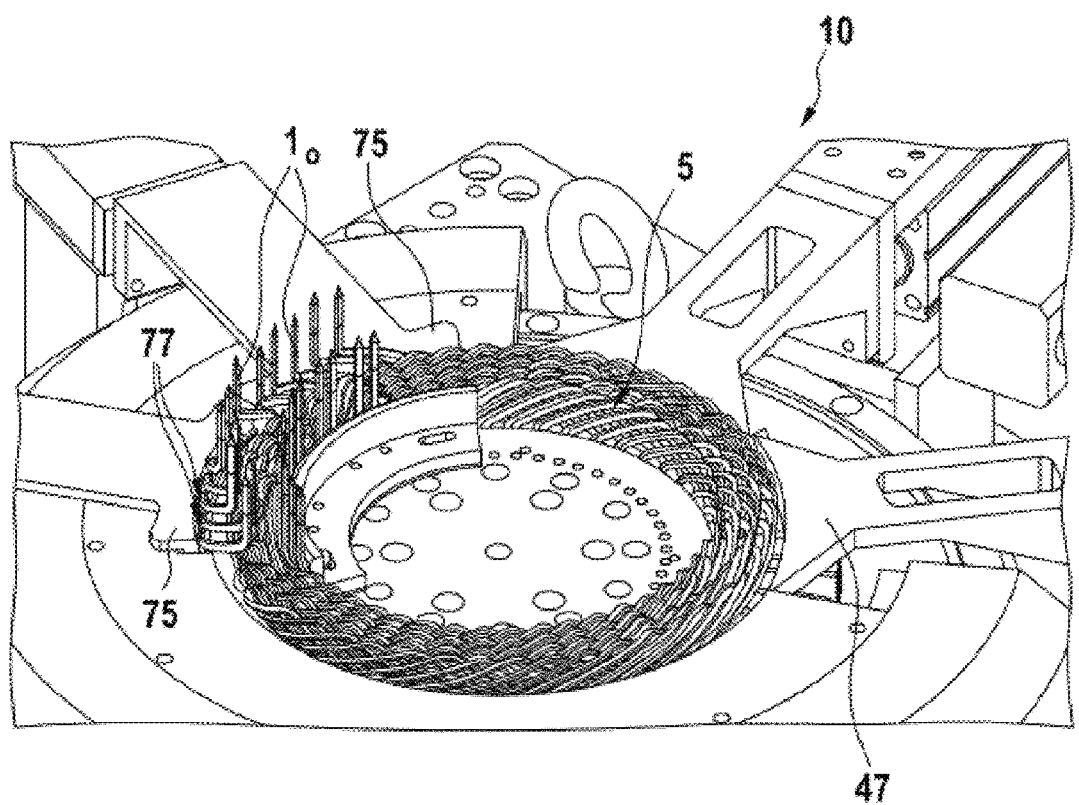
Figure 14:
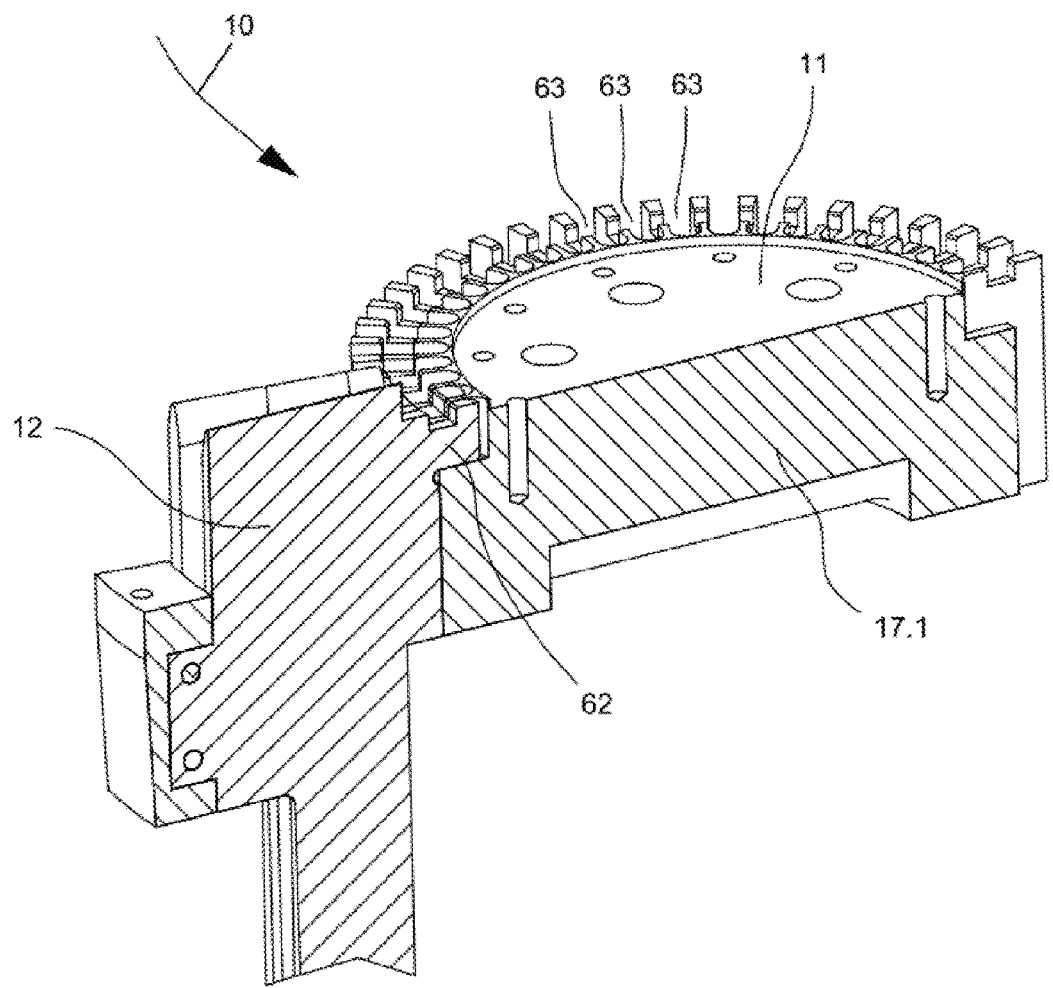
Figure 15:
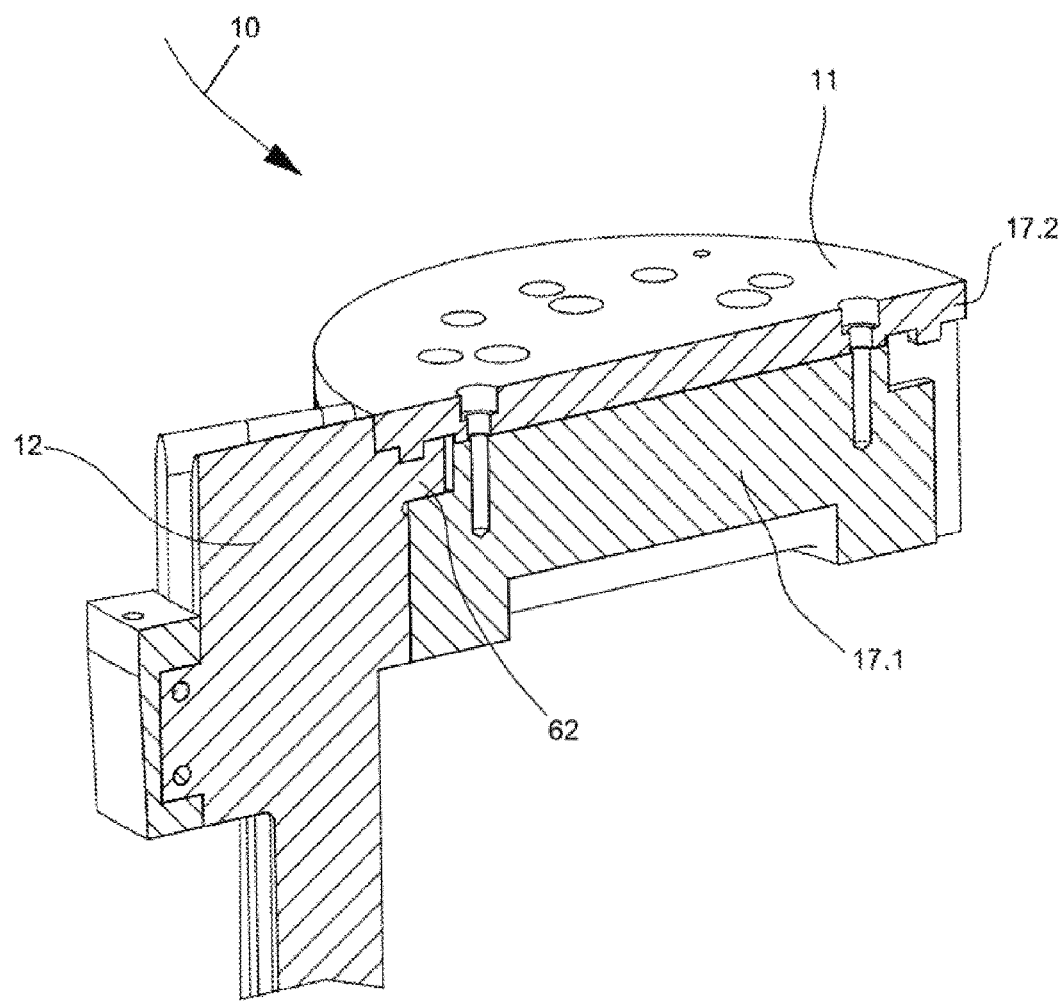
Figure 16:
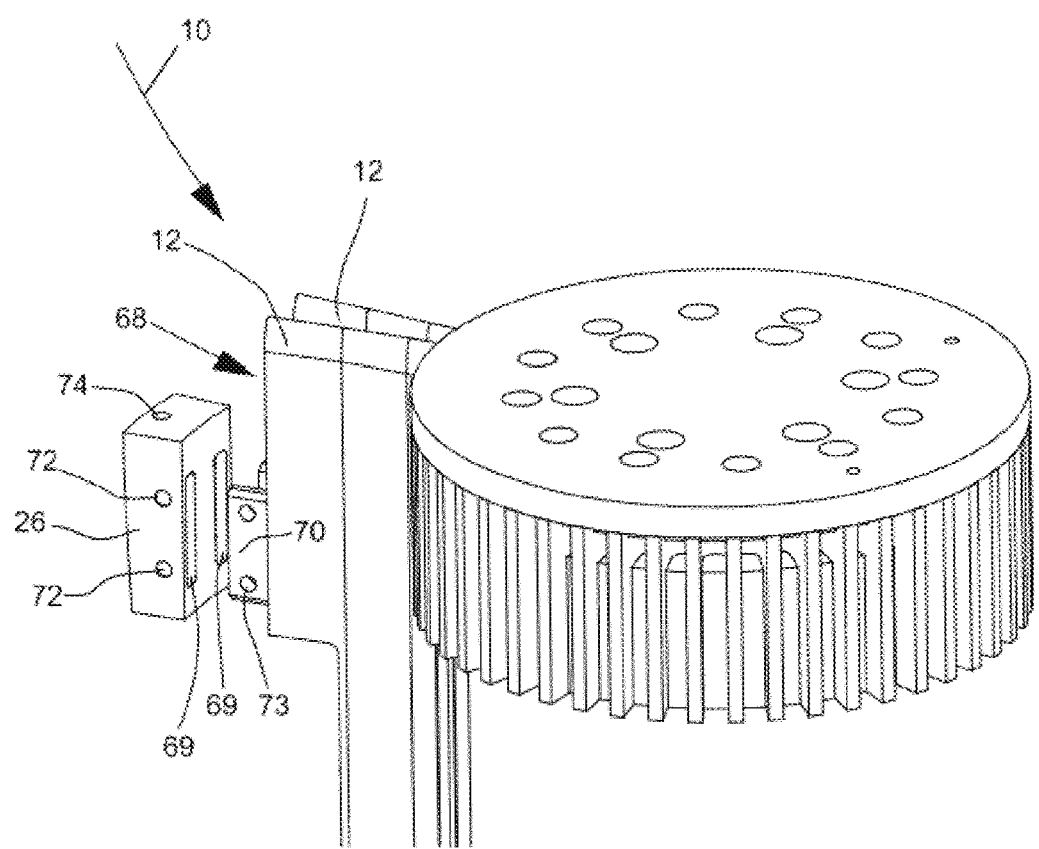
Figure 17:
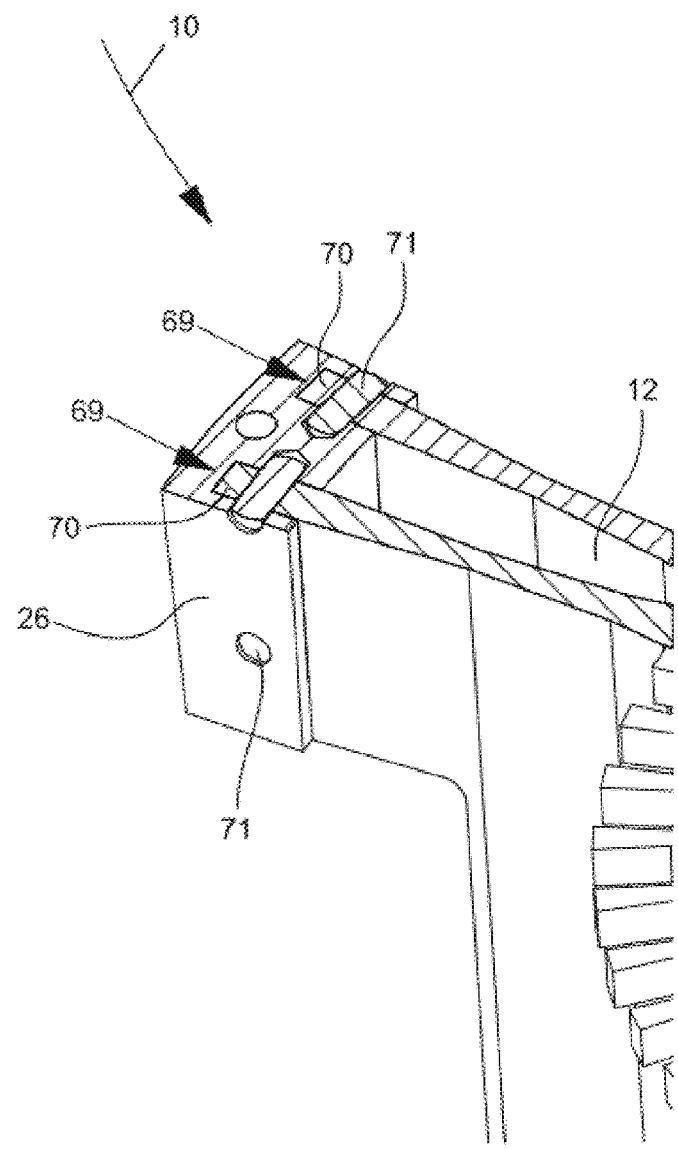
Figure 18:
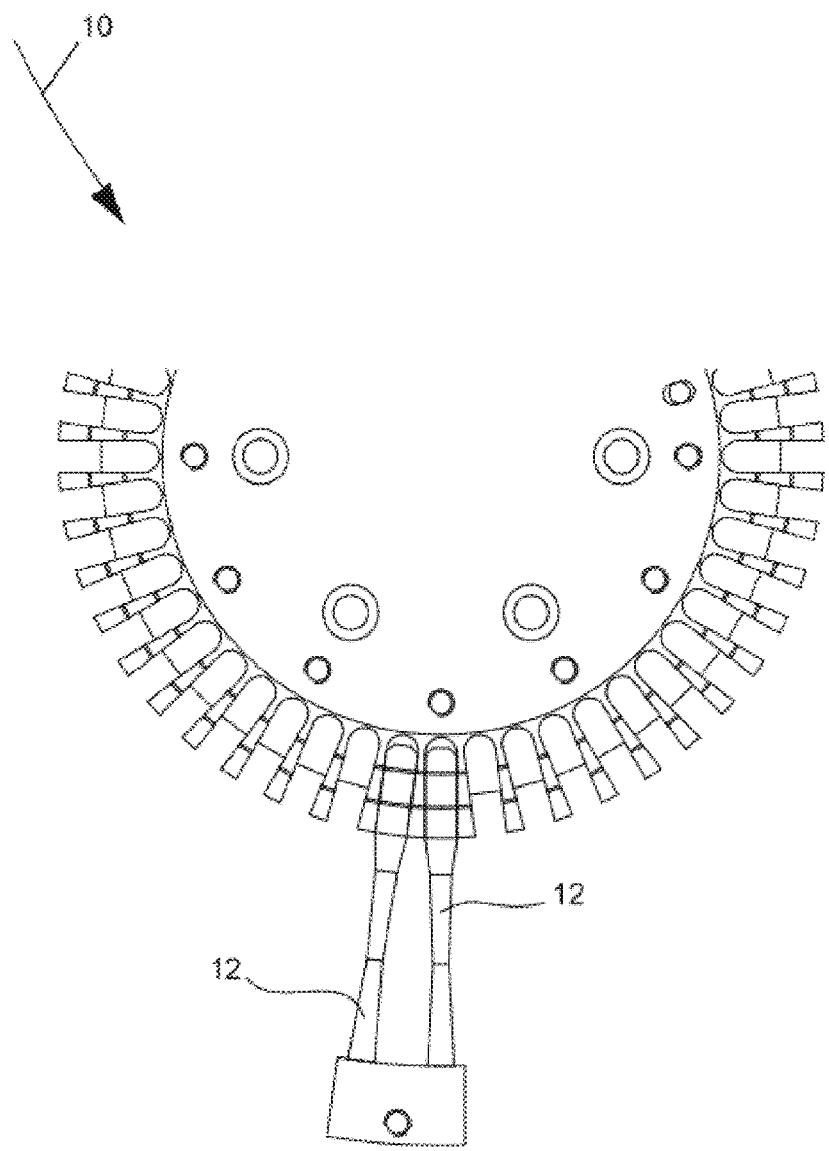
Figure 19:
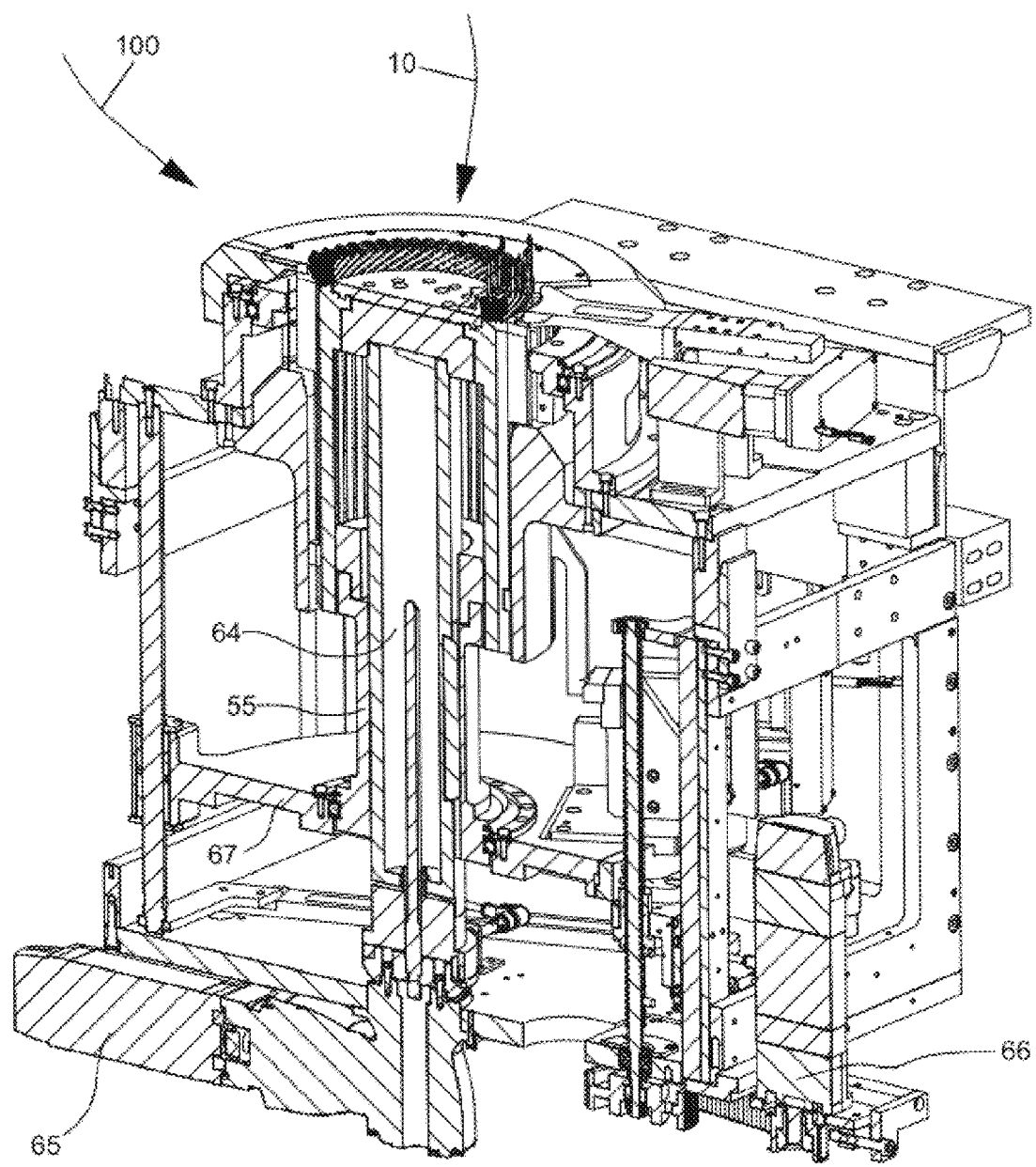
Figure 20:
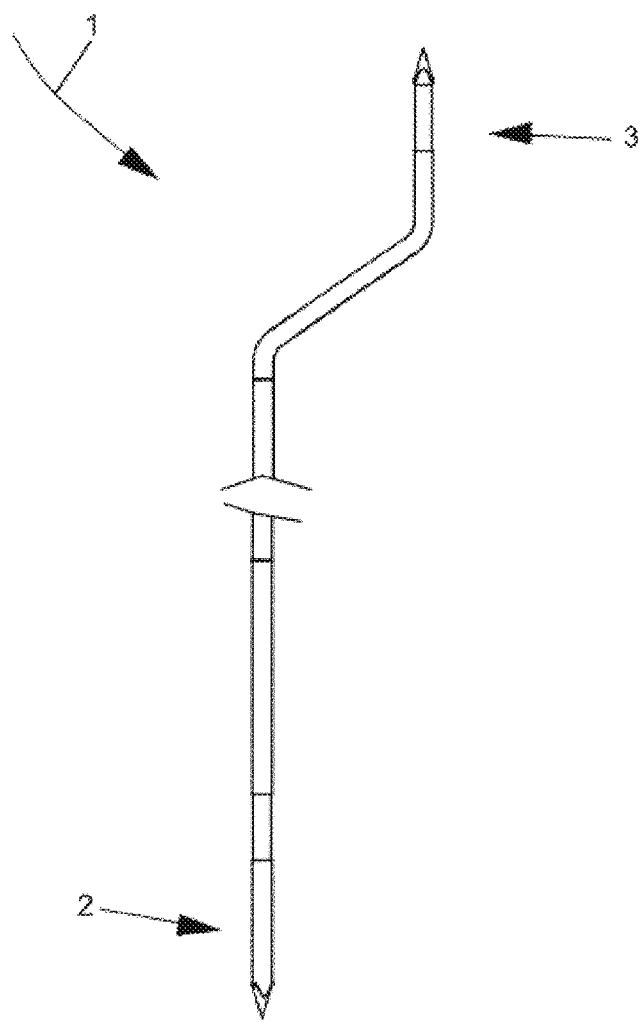
Figure 21:
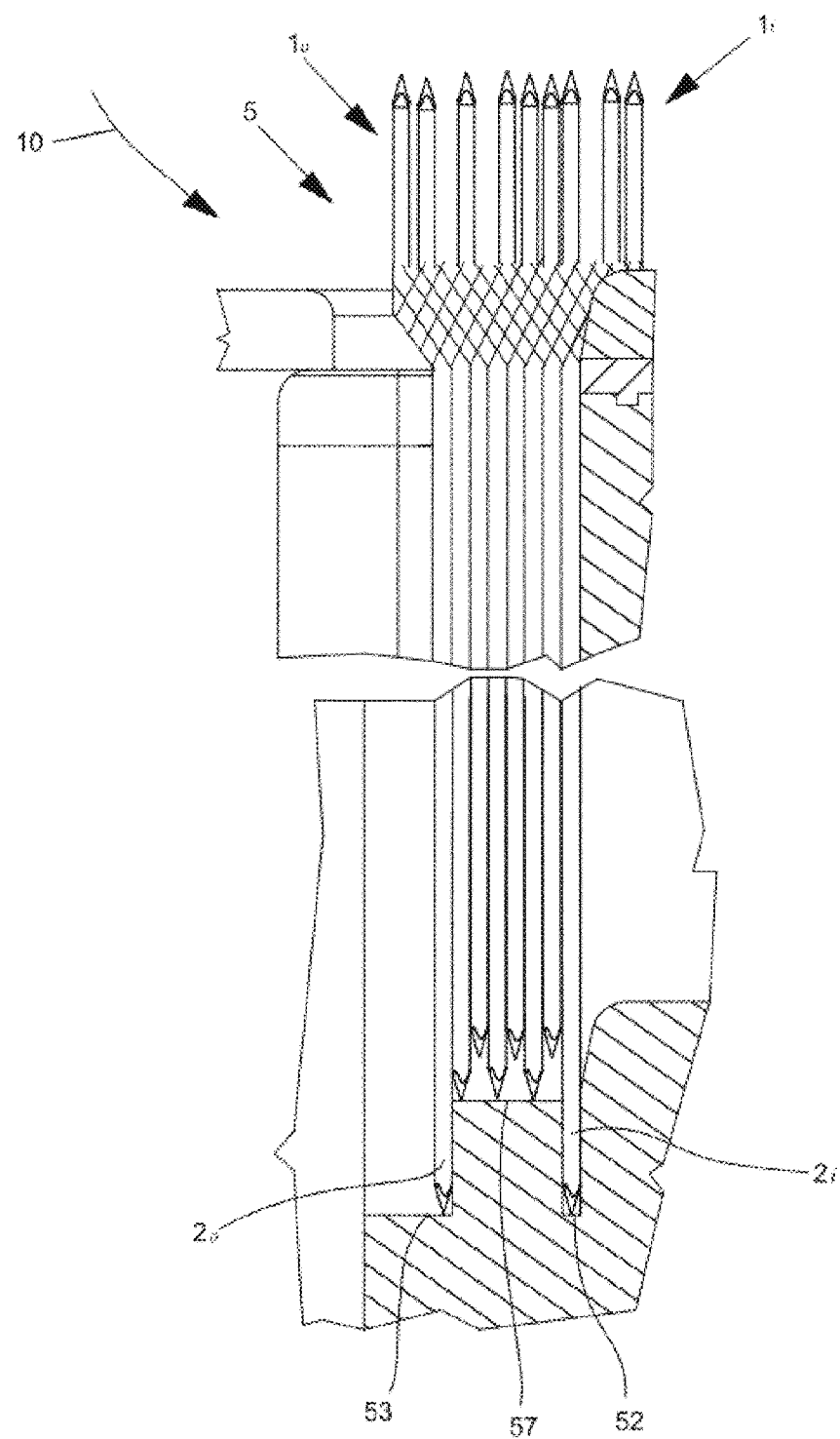

The invention will be explained hereinafter with reference to the description of specific embodiments and the respective drawings, which show:

FIG. 1 a first perspective sectional view of an apparatus according to the invention;

FIG. 2 a second perspective sectional view of the apparatus;

FIG. 3 a first side view of the apparatus;

FIG. 4 a first perspective view of the apparatus;

FIG. 5 a sectional view of the apparatus along a longitudinal axis and an enlarged detail;

FIG. 6 a second perspective view of the apparatus;

FIG. 7 a perspective view of a rim segment;

FIG. 8 a perspective view of a part of the stator core template;

FIG. 9 a part of the stator core template in top view;

FIG. 10 a further perspective view of a part of the stator core template;

FIG. 11a a top view on outer positioning tool in a first radial position;

FIG. 11b a top view on outer positioning tool in a second radial position;

FIG. 12 a perspective view of a part of a further example of stator core template;

FIG. 13 a further perspective view of the part of the example of FIG. 12;

FIG. 14 a first partial perspective view of a part of the stator core template;

FIG. 15 a second partial perspective view of a part of the stator core template;

FIG. 16 a third partial perspective view of a part of the stator core template;

FIG. 17 a forth partial perspective view of a part of the stator core template;

FIG. 18 a top view on a part of the stator core template;

FIG. 19 a third perspective sectional view of an apparatus according to the invention;

FIG. 20 a side view of an i-pin conductor;

FIG. 21 a sectional view of a part of a nest in stator core template.

FIG. 1 shows a first perspective sectional view of an apparatus 100 according to the invention.

The apparatus 100 comprises a stator core template 10, comprising a block body 11 provided with radially extending ribs 12.

Said ribs 12 form slots 13 therebetween for insertion of legs 2 of the pin conductors 1 (see for example FIG. 3).

An upper part 18 of the ribs 12 has a radial length 19 which is larger than the radial length 21 of a lower part 22 of the ribs 12. The ribs 12 have a continuous transition 61 between the upper part 18 and the lower part 22, in this case formed as a step.

The apparatus 100 comprises at least two ring elements 25, 33 arranged to provide an outer radial abutment face for inserted pin conductors 1 not explicitly shown.

A first ring element is formed by a separate ring 25 being fixedly connected to the ribs 12 and has an axial extension 23.1 which is smaller than the axial extension 24 of the ribs 12.

The separate ring 25 is arranged above the transition 61. The inner radius 28 of the separate ring 25 corresponds to the outer radius 29 of the upper part 18 of the ribs 12.

A second ring element is formed by a support ring 33 rotatably arranged with respect to the ribs 12.

The support ring 33 is arranged below the separate ring 25 and below the continuous transition 61.

The support ring 33 has an axial extension 23.2 which is smaller than the axial extension 24 of the ribs 12.

The apparatus 100 further comprises a lifting element 50.

The lifting element 50 comprises leg supports 51 for receiving legs 2 of pin conductors 1 (see FIG. 5 or 13). The number of leg supports 51 corresponds to the number of slots 13. Each leg support 51 is arranged in a respective slot 13 (see also FIG. 2).

Each leg support 51 comprises seats 52, 53, 57 for receiving legs 2 of different lengths.

The lifting element 50 has an axial contact face 54 for a drive element 55 (see FIG. 5) to generate an axial motion, in order to push upwards a partial nest or a nest of inserted pin conductors 1.

The lifting element 50 comprises an annular element 58 with the axial contact face 54. The annular element 58 is connected to the radially inner sides of the leg supports 51.

The lifting element 50 provides a central opening for guiding through a rotational drive element 64, which is connected to the block body 11 (see FIG. 5) for inducing a rotational movement of the stator core template 10.

The axial length 56 of the block body 11 is smaller than the axial length 24 of the ribs 12. The annular element 58 has an outer diameter 59 which corresponds to the outer diameter 60 of the block body 11. The annular element 59 is axially moveable below the block body 11.

FIG. 2 shows a second perspective sectional view of the outside of a part of the apparatus 100.

The upper level 14 of the block body 11 and an upper level 15 of the ribs 12 essentially are on same axial level 16.

The radially outward facing side 30 of the separate ring 25 comprises a contact surface 31, especially for a bearing 32 (see also FIG. 5).

The separate ring 25 is attached to shelf elements 26, which are connected to the ribs 12.

FIG. 3 shows a first side view of the apparatus 100.

The support ring 33 comprises an annular fixing flange 34 for fastening the separate ring 33 to a mounting frame 35.

The apparatus 100 further comprises a third ring element being formed by a hood element 42 (see also FIG. 6).

FIG. 4 shows a first perspective view of a part of the apparatus 100.

The support ring 33 comprises an axially extending opening 38 for inserting a lower pusher element 41 (see FIGS. 3 and 5). The opening 38 has a circumferential width 39 which corresponds to at least the maximal circumferential width 40 of a slot 13 formed by adjacent ribs 12 (see FIG. 2).

FIG. 5 shows a sectional view of the apparatus 100.

The inner radius 36 of the support ring 33 corresponds to an outer radius 37 of the lower part 22 of the ribs 12.

A radially innermost seat 52 and a radially outermost seat 53 are lower than the other seats 57 for receiving a longer leg 4. The longer leg 4 is inwardly pushed by the lower pusher element 41 to reach a respective innermost lower seat 52.

FIG. 6 shows a second perspective view on the topside of the apparatus 100.

The hood element 42 has a radially inner surface 43 arranged axially above the upper level 15 of the ribs 12. The radially inner surface 43 has an inner diameter 44 smaller than an outer diameter 45 of the upper level 16 of the stator core template 10 (see FIG. 4). Hence, the radially inner surface 43 is adapted to contact an upper part of at least a part of inserted pin conductors 1.

The hood element 42 has a shape of a ring segment with an open area 46 which allows access for at least one upper pusher element 47 for pushing inwardly the upper part an inserted pin conductor 1.

The apparatus 100 further comprises a rim segment 48 which is mounted to the upper face 49 of the block body 11.

The rim segment 48 prevents radial inward tilting or movement of at the upper parts 3 of pin conductors 1 (see FIG. 5 or 13).

FIG. 7 shows a perspective view of a rim segment 48.

The rim segment 48 comprises a body part 81 with a flange 82 to be mounted on the upper face 49 of a block body 11 (see FIG. 8) and a wall 83. The wall 83 extends in an axial direction A and in a circumferential direction C.

On the radially outer surface 84 of the wall 83 a pocket element 85 is mounted to the rim segment 48.

The pocket element 85 comprises a railing 86 and separating members 87. The railing 86 is connected to the wall 83 by the separating members 87. The separating members 87 form a number of pockets 88 on the radial inside of the railing 86 which are delimited by the railing 86, the wall 83 and the separating members 87.

FIG. 8 shows a perspective view of a part of the stator core template 10.

The rim segment 48 is mounted at the radially inward end of the ribs 12.

The flange 82 comprises mounting holes 89 for fixing the rim segment 48 to the top surface 49 of the block body 11.

The pockets 88 are aligned with slots 13 formed by the ribs 12.

FIG. 9 shows a part of the stator core template 10 in a top view.

The circumferential distance 90 between two adjacent separating members 87 corresponds to the circumferential distance 91 between the radially innermost parts of respective lateral walls 92 of adjacent ribs 12. Thus, the pockets 88 are precisely aligned with the slots 13.

The opening 93 for inserting i-pins are each delimited by a radially innermost part of respective lateral walls 92, by the wall 83, by the railing 86 and by a separating member 87.

FIG. 10 shows a further perspective view of a part of the stator core template 10 during removal of the nest (not completely shown).

For the sake of clarity FIG. 10 only shows the innermost layer of conductors 1.

Each i-pin conductor $1_i$ of the innermost layer is positioned in a respective pocket 88.

Each i-pin conductor $1_i$ of the innermost layer is supported by the rim segment 48.

The wall 83 prevents radially inward tilting of the i-pin conductor. The railing 86 prevents radially outward tilting. The separation members 87 and the radially innermost part of respective lateral walls 92 prevent rotation of the i-pin conductors $1_i$ around an axis in axial direction A.

In the embodiment shown in FIGS. 11a, 11b, 12 and 13 the stator core template 10 comprises a hood element 42 with two outer positioning tools 75 which are radially moveable with respect to the ribs 12.

FIG. 11a shows a top view of an outer positioning tool 75 in a first radial position, FIG. 11b in a second radial position.

Each outer positioning tool 75 comprises a radially inwardly protruding pocket element 76 providing a number of pockets 77.

The pocket element 76 comprises a railing 101 and separating members 102. The railing 101 is connected to a radially inward facing wall 103 of the positioning tool 76 by the separating members 102. The separating members 102 form a number of pockets 77 on the radial outside of the railing 101 which are delimited by the railing 101, the wall 103 and the separating members 102.

The pocket element 76 is arranged at the radially inner end of radially moveable arms 78 (FIG. 12). The hood element 42 comprises a rim segment 79, providing a radially inner surface 43 (FIG. 11a). The rim segment 79 has a recess 80 extending along a circumferential length 99 corresponding to the sum of the circumferential lengths of the pocket elements 76 of the positioning tools 75, such that the pocket elements 76 are arranged within the recess 80.

In the radially outer position (see FIG. 11a) the radially inner side of the railing 101 is axially aligned with the inner surface 43 of the rim segment 79.

Thus the complete pocket element 76 is arranged outside the intended position of the outermost layer of the nest.

The outer positioning tool 75 may be pushed radially inwards into a radially inner position (see FIG. 11b).

The radial inward movement ends, when the circumferentially adjacent edges 104, 105 of the pocket elements 76 abut.

FIG. 12 shows a perspective view of a part of an example of stator core template 10 with two outer positioning tools 75.

The pockets 77 are aligned with slots 13 formed by the ribs 12. The separating members 102 have a radial length 106 which corresponds to the radial width of the i-pin conductors $1_o$ such that each pocket 77 receives only one i-pin conductor and prevents axial rotation of the i-pin conductors $1_o$ (see FIG. 13).

FIG. 13 shows a further perspective view of the part of the example of FIG. 12 having two outer positioning tools 75 when the forming of the nest 5 in the stator core template 10 is almost finished.

The i-pin conductors $1_o$ of the outermost layer have been introduced in the pockets 77 of the outer positioning tools 75. The outer positioning tools 75 are still in the radially outer position as shown in FIG. 11a. Hence the legs of the i-pin conductors $1_o$ positioned in the pockets 77 do not get in contact with the legs of the other conductors, which are arranged radially more inwardly.

Once all i-pin hairpins have been inserted and are radially properly arranged, for example by the upper pusher elements 47, the outer positioning tools 76 may be moved inwardly to move the upper portions of the i-pin conductors $1_o$ towards the inner layers of the nest.

The pockets prevent radial outward and inward tilting or movement of the upper portions of the i-pin conductors $1_o$.

The i-pin conductors $1_o$ are moved from a position outside the nest 5 to the outermost layer of the nest 5.

FIG. 14 shows a second perspective view of a part of the stator core template 10.

Each rib 12 has a male projection 62.

The male projections 62 of the ribs 12 are inserted in respective female recesses 63 arranged within the lower part 17.1 of the block body 11 to form a positive connection.

FIG. 15 shows a first perspective view of a part of the stator core template 10.

The block body 11 comprises a lower part 17.1 and a fixing plate 17.2. arranged above the lower part 17.1.

The form fit connections between the male projections 62 of the ribs 12 and the female recesses 63 (see FIG. 14) are secured by the fixing plate 17.2 of the block body 11, which prevents the male projections 62 from leaving the female recesses 63.

FIGS. 16 and 17 show a third partial perspective view and a forth partial perspective view of a part of the stator core template 10 to explain the fixation of the shelf elements 26 to the ribs 12.

The shelf elements 26 comprise securing holes 74 for fixation of the separate ring 25 (see FIG. 1).

Some of adjacent pairs of ribs 12 comprise extensions 70 on their outer radial surface 68. The extensions 70 may be inserted into respective recesses 69 of shelf element 26.

As can be seen best in FIG. 17, after having inserted the extensions 70 in to the recesses 69 of shelf element 26 the convection is secured by bolts 71. Alternatively, for example also screws can be used.

The bolts 71 are inserted in to respective bolt holes 72 in the shelf element 26 and bolt holes 72 in the extensions 70 (see FIG. 16).

As can be seen in FIG. 18, showing a top view on a part of the stator core template 10, the ribs 12 may be machined parts with a varying thickness along the radial extension.

FIG. 19 shows a third perspective sectional drawing of an apparatus 100 according to the invention.

The apparatus comprises a first drive motor 65 for inducing a rotational motion of a rotational drive element 64.

The apparatus comprises a second drive motor 66 for inducing a axial motion of a axial drive element 55 via a lifting platform 67.

FIG. 20 shows a side view of pin conductor 1, in this case an i-pin conductor. The i-pin conductor 1 comprises only one leg 2. Usually the upper part 3 of the i-pin conductor 1 is pre bended.

As the i-pin conductor 1 only comprises one leg 2, there is no self-stabilization of the pin conductor, unlike for example hairpin conductors, which have two legs arranged in different slots (not explicitly shown in the figures).

Hence i-pin conductors need a specific handling when inserted in a stator core template 10.

When an i-pin conductor 1 is inserted into a slot 13 of the stator core template 10 the lower part of the i-pin conductor is prevented from radially moving to the outside of least a lower part 22 of the ribs 12 by the support ring 33, as can be seen for example in FIG. 5.

The upper part of the slots 13 is radially confined by the separate ring 25.

The leg 2 of an internal i-pin conductor 1 of a nest is radially moved inwards by the lower pusher element 41 being radially moved into the opening 38 of the support ring 33.

The i-pin conductor 1 is then radially aligned with the respective seat 52 and may fall down on the leg support 51 of the lifting element 50 into the respective seat 52.

The upper parts 3 of the internal i-pin conductors 1 are stabilized by the rim element 48.

Similarly, an external i-pin conductor of a nest is radially held in a respective seat 53 and is prevented from moving out of the stator core template through the opening 38 by the lower pusher element 41.

For insertion the i-pin conductor 1 hence does not need to be placed exactly in a specific radial position. The i-pin conductor 1 may be inserted anywhere in the slot 13, in particular in a radially outer region, where the slot 13 has a bigger circumferential width 40 (see FIG. 2). After having been inserted in the slot 13, the i-pin conductor 1 may be pushed into the intended radial position. As the leg 2 of the i-pin conductor 1 cannot escape from the respective seat 52, 53, the radial position of the i-pin conductor 1 remains fixed.

After insertion of a the i-pin conductor 1 the stator core template 10 is rotated by means of the driving motor 65 and the rotational driving element 64 (see FIG. 18).

Another pin conductor 1 is then inserted into at least one of the slots, and the steps of radially moving the pin conductors and positioning the pin conductors by an upper pusher element 47 and/or a lower pusher element 41 are repeated.

Once all pin conductors necessary for forming the partial nest or the nest 5 are properly positioned, the nest may be pushed upwards by axially moving the lift 50 element via a drive element 55.

The partial nest or the nest 5 may then be removed from the stator core template 10.

A final position of the nest 5 in the stator core template 10 may be seen in FIG. 21 showing a schematic drawing of a sectional view of a part of a nest in stator core template.

The i-pins $1_i$ in the innermost layer of nest 5 and the i-pins $1_o$ in the outermost layer of nest 5 are longer than rest of the nest 5. The respective legs $2_i$ and $2_o$ accordingly are positioned in seats 52, 53 which are axially lower than the other seats 57.

The invention claimed is:

1. An apparatus for manufacturing an at least partial nest of pin conductors for forming a stator, the apparatus comprising a stator core template, wherein:

the stator core template comprises a block body provided with radially extending ribs, said ribs forming slots therebetween for insertion of legs of the pin conductors;

the apparatus further comprises at least one ring element arranged to provide an outer radial abutment face for inserted pin conductors; and at least an upper part of the ribs has a radial length which is larger than the radial length of a lower part of the ribs, the ribs comprising a continuous transition between the upper part and the lower part.

2. An apparatus according to claim 1, wherein an upper level of the block body and an upper level of the ribs are on a same axial level.

3. An apparatus according to claim 1, wherein at least a part of the block body and the ribs are machined as a single piece.

4. An apparatus according to claim 3, wherein the ribs are machined as a single piece from a steel cylinder.

5. An apparatus according to claim 1, wherein the ring element has an axial extension which is smaller than the axial extension of the ribs.

6. An apparatus for manufacturing an at least partial nest of pin conductors for forming a stator, the apparatus comprising a stator core template, wherein:

the stator core template comprises a block body provided with radially extending ribs, said ribs forming slots therebetween for insertion of legs of the pin conductors;

the apparatus further comprises at least one ring element arranged to provide an outer radial abutment face for inserted pin conductors;

the at least one ring element comprises a separate ring connected to the ribs; and the separate ring is attached to shelf elements, which are connected to the ribs.

7. An apparatus according to claim 6, wherein an upper level of the separate ring is arranged axially below the upper level of the block body.

8. An apparatus according to claim 6, wherein the radially outward facing side of the separate ring comprises a contact surface for either (a) a bearing or (b) a drive element, to generate a rotary motion.

9. An apparatus for manufacturing an at least partial nest of pin conductors for forming a stator, the apparatus comprising a stator core template, wherein:

the stator core template comprises a block body provided with radially extending ribs, said ribs forming slots therebetween for insertion of legs of the pin conductors;

the apparatus further comprises at least one ring element arranged to provide an outer radial abutment face for inserted pin conductors;

the at least one ring element is formed by a support ring rotatably arranged with respect to the ribs;

the support ring comprises an opening for inserting a pusher element, the opening having a circumferential width of at least the maximal circumferential width of a slot formed by adjacent ribs; the apparatus further comprising:

a lower pusher element which is arranged to be radially moveable into the opening of the support ring from the radial outside of the support ring.

10. An apparatus according to claim 9, wherein the support ring comprises a fixing flange for fastening the separate ring to a mounting frame.

11. An apparatus according to claim 9, wherein an inner radius of the support ring corresponds to an outer radius of a lower part of the ribs.

12. An apparatus for manufacturing an at least partial nest of pin conductors for forming a stator, the apparatus comprising a stator core template, wherein:
the stator core template comprises a block body provided with radially extending ribs, said ribs forming slots therebetween for insertion of legs of the pin conductors;
the apparatus further comprises at least one ring element arranged to provide an outer radial abutment face for inserted pin conductors; and
the at least one ring element comprises a hood element having a radially inner surface being arranged axially above the upper level of the ribs and having a radial inner diameter being smaller than a radial diameter of the upper level of the stator core template, being adapted to contact an upper part of at least a part of inserted pin conductors.

13. An apparatus according to claim 12, wherein the hood element is fastenable to a mounting frame and is arranged rotatably with respect to the ribs.

14. An apparatus according to claim 12, wherein the hood element has a shape of a ring segment with an open area which allows access for at least one upper pusher element for pushing inwardly the upper part of at least one inserted pin conductor.

15. An apparatus according to claim 14, wherein the apparatus comprises at least one upper pusher element for pushing inwardly the upper part of at least one inserted pin conductor.

16. An apparatus for manufacturing an at least partial nest of pin conductors for forming a stator, the apparatus comprising a stator core template, wherein:
the stator core template comprises a block body provided with radially extending ribs, said ribs forming slots therebetween for insertion of legs of the pin conductors;
the apparatus further comprises at least one ring element arranged to provide an outer radial abutment face for inserted pin conductors; and
the apparatus comprises at least one outer positioning tool, the at least one outer positioning tool having a radially inwardly protruding pocket element providing at least one pocket for stabilizing the radial outside of an i-pin conductor.

17. An apparatus according to claim 16, wherein the at least one outer positioning tool is radially moveable.

18. An apparatus for manufacturing an at least partial nest of pin conductors for forming a stator, the apparatus comprising a stator core template and a rim segment, wherein:
the stator core block has a block body provided with radially extending ribs, said ribs forming slots therebetween for insertion of legs of the pin conductors; and
the rim segment is mounted to the upper face of the block body which prevents radial inward bending or movement of at least one upper part of a pin conductor.

19. An apparatus according to claim 18, wherein the rim segment comprises a radially outwardly protruding pocket element providing at least one pocket for supporting the radial outside of an i-pin conductor.

20. An apparatus according to claim 18, wherein the apparatus comprises a lifting element, the lifting element comprising an axial contact face for a drive element to generate an axial motion, in order to push upwards an at least partial nest of inserted pin conductors.

21. An apparatus according to claim 20, wherein the lifting element comprises leg supports for receiving legs of the pin conductors, the number of leg supports corresponding to the number of slots and each leg support being arranged in a respective slot.

22. An apparatus according to claim 21, wherein each leg support comprises seats for receiving legs of different lengths.

23. An apparatus according to claim 20, wherein the lifting element comprises an annular element comprising the axial contact face, being connected to the radially inner sides of the leg supports.

24. An apparatus according to claim 23, wherein the axial length of the block body is smaller than the axial length of the ribs and the annular element is axially moveable below the block body.

25. A method for manufacturing an at least partial nest of pin conductors for forming a stator, comprising:
providing an apparatus for manufacturing an at least partial nest of pin conductors for forming a stator, the apparatus comprising:
a stator core template with a block body provided with radially extending ribs forming slots in between for insertion of legs of the pin conductors, and
at least one ring element being arranged to provide an outer radial abutment face for the legs of inserted pin conductors;
inserting at least one pin conductor into at least one of said slots of the stator core template such that said pin conductor is arranged at a first position within said slot, wherein in said first position the pin conductor is arranged differently than in the in-tended position in the stator core template;
moving said pin conductor within said slot of said a stator core template from said first position to a second position;
repeating, for at least one additional pin conductor, the providing the apparatus and the inserting at least one pin conductor into at least one of said slots of the stator core template, to form a first layer of an at least partial nest of pin conductors; and
removing the at least partial nest of pin conductors from the stator core template.

26. A method according to claim 25, the removing the at least partial nest of pin conductors from the stator core template comprising axially moving a lifting element comprising leg supports for receiving legs of the of pin conductors.

27. A method according to claim 25, further comprising:
inserting at least one i-pin conductor into at least one of said slots of the stator core template;
preventing the lower part of the i-pin conductor from radially extending to the outside of least a lower part of the ribs by the ring element being formed as a support ring which is rotatably arranged with respect to the ribs; and
radially moving inwards the leg of the i-pin conductor by a lower pusher element being radially moved into an opening of the support ring, said opening having a circumferential width which corresponds to the maximal circumferential width of a slot formed by adjacent ribs.

28. A method according to claim 27, further comprising rotating the stator core template and inserting another pin conductor into at least one of the slots.

29. A method according to claim 27, further comprising radially moving the leg of the i-pin conductor during radially inward movement of the i-pin conductor until it reaches the radial position of a respective seat being arranged on a leg support for receiving legs of pin conductors.

\* \* \* \* \*